US012795217B2

(12) United States Patent
Beatch

(10) Patent No.: US 12,795,217 B2
(45) **Date of Patent: *Nov. 10, 2026**

(54) SYSTEMS AND METHODS FOR STANDALONE RECORDING DEVICES AND GENERATING VIDEO COMPILATIONS

(71) Applicant: Kyle Quinton Beatch, Grand Cayman (KY)

(72) Inventor: Kyle Quinton Beatch, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 19/094,408

(22) Filed: Mar. 28, 2025

(65) Prior Publication Data

US 2026/0107046 A1 Apr. 16, 2026

Related U.S. Application Data

(63) Continuation-in-part of application No. 18/447,848, filed on Aug. 10, 2023, now Pat. No. 12,294,746.

(60) Provisional application No. 63/397,207, filed on Aug. 11, 2022.

(51) Int. Cl.

| | |
|---|---|
| ***G06V 20/40*** | (2022.01) |
| ***H04N 21/2187*** | (2011.01) |
| ***H04N 21/234*** | (2011.01) |
| ***H04N 21/258*** | (2011.01) |
| ***H04N 21/431*** | (2011.01) |
| ***H04N 21/472*** | (2011.01) |
| ***H04N 21/485*** | (2011.01) |
| ***H04N 21/845*** | (2011.01) |
| ***H04N 21/8549*** | (2011.01) |

(52) U.S. Cl.
CPC ......... *H04N 21/8549* (2013.01); *G06V 20/44* (2022.01); *G06V 20/47* (2022.01); *H04N 21/2187* (2013.01); *H04N 21/23424* (2013.01); *H04N 21/25891* (2013.01); *H04N 21/4318* (2013.01); *H04N 21/47217* (2013.01); *H04N 21/4854* (2013.01); *H04N 21/8456* (2013.01)

(58) Field of Classification Search
CPC ........... H04N 21/8549; H04N 21/2187; H04N 21/23424; H04N 21/25891; H04N 21/4318; H04N 21/47217; H04N 21/4854; H04N 21/8456; G06V 20/44; G06V 20/47
See application file for complete search history.

(56) References Cited

U.S. PATENT DOCUMENTS 12,294,746 B2 * 5/2025 Beatch ............ H04N 21/25891

* cited by examiner

*Primary Examiner* — John R Schnurr
(74) *Attorney, Agent, or Firm* — McDonnell Boehnen Hulbert & Berghoff LLP

(57) ABSTRACT

Systems and methods disclosed herein include a method implemented by a computing system, the method comprising: (i) creating a first and second user profile associated with a recreational activity; (ii) receiving a first and second user input, wherein the first and second user input comprises selecting the first and second user profile associated with the recreational activity; (iii) in response to receiving the first or second user input, recording a first and second live video feed of a first and second portion of the recreational activity; and (iv) executing an automated video processing procedure.

20 Claims, 14 Drawing Sheets

SYSTEMS AND METHODS FOR STANDALONE RECORDING DEVICES AND GENERATING VIDEO COMPILATIONS

This application is a continuation of U.S. patent application Ser. No. 18/447,848 filed on Aug. 10, 2023, which claims the benefit of priority under 35 U.S.C. § 119(e) of U.S. Provisional Application No. 63/397,207 filed Aug. 11, 2022, the content of which is incorporated herein by reference in its entirety.

TECHNICAL FIELD

The systems and methods disclosed herein relate generally to devices, systems, and methods for recording and compiling recordings of recreational activities, such as in the context of indoor and outdoor of recreational activities.

SUMMARY

Example embodiments relate to a computing device that allows for the effective tracking of participants and operators of indoor and outdoor of recreational activities, as well as capturing, modifying, and compiling video segments of the indoor and outdoor of recreational activities, all of which may be used to make a video and/or other graphical representations of the indoor and outdoor of recreational activities. In some embodiments, the computing device includes a camera, a network interface, a graphical user interface, one or more processors, and a non-transitory, computer-readable medium storing instructions that, when executed by the one or more processors, cause the computing device to perform a set of acts. In some embodiments, the set of acts include: (i) creating a first user profile associated with a recreational activity; (ii) creating a second user profile associated with the recreational activity; (iii) receiving a first user input, via the graphical user interface, wherein the first user input comprises selecting at least one of the first and second user profile associated with the recreational activity; (iv) in response to receiving the first user input, recording a first live video feed of a first portion of the recreational activity; (v) receiving a second user input, via the graphical user interface, wherein the second user input comprises selecting at least one of the first and second user profile associated with the recreational activity; (vi) in response to receiving the second user input, recording a second live video feed of a second portion of the recreational activity. In some embodiments, the set of acts also includes executing an automated video processing procedure comprising: (i) selecting, via the graphical user interface, one or more segments of the received first live video feed for further processing, wherein the one or more segments of the received first live video feed are selected based on the received first user input; (ii) selecting, via the graphical user interface, one or more segments of the received second live video feed for further processing, wherein the one or more segments of the received first live video feed are selected based on the received second user input; (iii) for each of the selected one or more segments of the received first live video feed and the second live video feed, modifying the selected one or more segments of the received first live video feed and the second live video feed to generate a compilation video of the recreational activity; (iv) generating the compilation video of the recreational activity, wherein the generated compilation video comprises the modified one or more segments of the received first live video feed and the second live video feed, and wherein the generated compilation video is associated with at least one of the first user profile and the second user profile; and (v) based on the generated compilation video being associated with at least one of the first user profile and the second user profile, transmitting, via the network interface, the compilation video to a participant device associated with at least one of the first user profile and the second user profile.

Furthermore, because this video processing procedure is automated (or at least semi-automated), and occurs in real time (or substantially real time) while a participant is engaged in the recreational activity, any editing and/or compilation procedures also occur during the activity and are completed at the same time, or at substantially the same time, that the participant completes the activity, so the participant and the user are able to focus on the activity, and not the recording and/or editing processes. This result saves the participant (and the user) time and effort and allows them to focus on the activity exclusively and maximizes the participant's level of satisfaction with the activity and the experience.

In some embodiments, a method for generating a video compilation of a recreational activity implemented by a computing system is disclosed. The method further includes: (i) creating a first user profile associated with the recreational activity; (ii) creating a second user profile associated with the recreational activity; (iii) receiving a first user input, wherein the first user input comprises selecting at least one of the first and second user profile associated with the recreational activity; (iv) in response to receiving the first user input, recording a first live video feed of a first portion of the recreational activity; (v) receiving a second user input, wherein the second user input comprises selecting at least one of the first and second user profile associated with the recreational activity; (vi) in response to receiving the second user input, recording a second live video feed of a second portion of the recreational activity; and (vii) executing an automated video processing procedure comprising: (a) selecting one or more segments of the received first live video feed for further processing, wherein the one or more segments of the received first live video feed are selected based on the received first user input; (b) selecting one or more segments of the received second live video feed for further processing, wherein the one or more segments of the received first live video feed are selected based on the received second user input; (c) for each of the selected one or more segments of the received first live video feed and the second live video feed, modifying the selected one or more segments of the received first live video feed and the second live video feed to generate a compilation video of the recreational activity; (d) generating the compilation video of the recreational activity, wherein the generated compilation video comprises the modified one or more segments of the received first live video feed and the second live video feed, and wherein the generated compilation video is associated with at least one of the first user profile and the second user profile; and (e) based on the generated compilation video being associated with at least one of the first user profile and the second user profile, transmitting the compilation video to a participant device associated with at least one of the first user profile and the second user profile.

Some embodiments include a system comprising at least one processor and a tangible, non-transitory computer readable medium having stored therein instructions that, upon execution by a computing system, cause the computing system to perform a set of operations, including but not limited to the operations and functions described herein. The set of operations includes (i) creating a first user profile associated with the recreational activity; (ii) creating a second user profile associated with the recreational activity; (iii) receiving a first user input, wherein the first user input comprises selecting at least one of the first and second user profile associated with the recreational activity; (iv) in response to receiving the first user input, recording a first live video feed of a first portion of the recreational activity; (v) receiving a second user input, wherein the second user input comprises selecting at least one of the first and second user profile associated with the recreational activity; (vi) in response to receiving the second user input, recording a second live video feed of a second portion of the recreational activity; and (vii) executing an automated video processing procedure comprising: (a) selecting one or more segments of the received first live video feed for further processing, wherein the one or more segments of the received first live video feed are selected based on the received first user input; (b) selecting one or more segments of the received second live video feed for further processing, wherein the one or more segments of the received first live video feed are selected based on the received second user input; (c) for each of the selected one or more segments of the received first live video feed and the second live video feed, modifying the selected one or more segments of the received first live video feed and the second live video feed to generate a compilation video of the recreational activity; (d) generating the compilation video of the recreational activity, wherein the generated compilation video comprises the modified one or more segments of the received first live video feed and the second live video feed, and wherein the generated compilation video is associated with at least one of the first user profile and the second user profile; and (e) based on the generated compilation video being associated with at least one of the first user profile and the second user profile, transmitting the compilation video to a participant device associated with at least one of the first user profile and the second user profile.

It should be noted that this summary is for the purposes of illustration only. Specifically, this summary should not be read in any way as limiting to the aspects, examples, and embodiments of the claimed invention disclosed herein.

DETAILED DESCRIPTION

Figure 1:
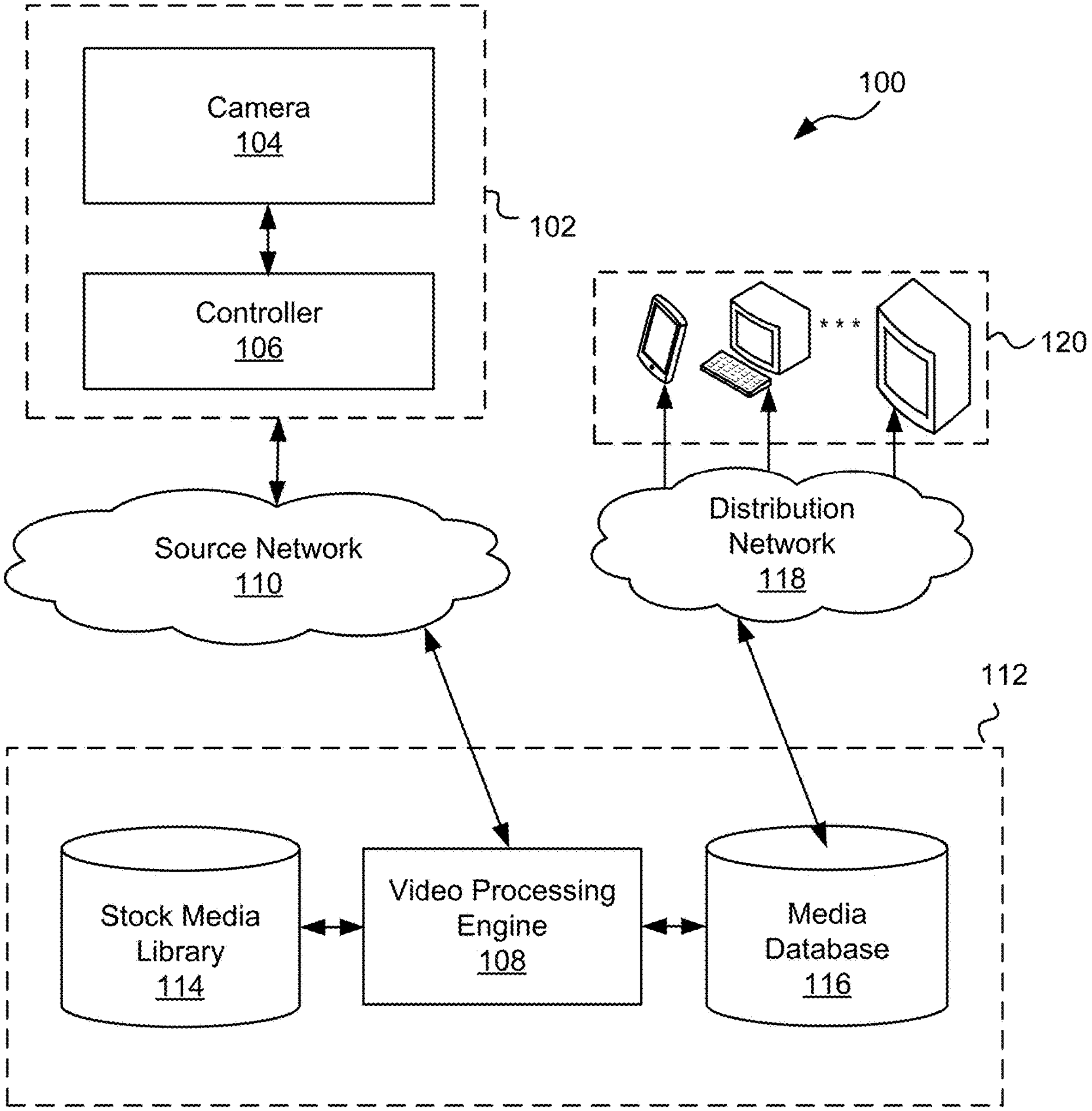
FIG. 1 depicts a system architecture, in accordance with example embodiments.

Example methods and computing systems are described herein. Any aspect, example, or embodiment described herein should not be construed as preferred or advantageous over other potential embodiments or features. Instead, it should be easily and readily understood that certain aspects of the disclosed computing systems and methods can be arranged and combined in a host of different ways.

Additionally, the arrangements reflected in the Figures should not be regarded as limiting, but instead should be viewed as examples only. Further, these examples and others could contain more or fewer of any given element, a different arrangement of those elements, and/or, the deletion of one or more of those elements and/or the addition of one or more other elements.

I. Overview

In the context of recording indoor and outdoor recreational events and/or activities, cameras are often used to capture video while indoor and outdoor recreational events and/or activities occur. This recording process is often more beneficial, impactful, and efficient if the camera or cameras can be moved around dynamically during the recoding of the indoor and outdoor recreational events and/or activities. These configurations may help to focus on a particular angle or direction of the recreation participant's face or other relevant portions of the activity, but may present other issues that deteriorate the quality of the recording or the participant's ability to quickly receive, review, and/or purchase the recording.

Further, recordings captured in this fashion may be from a single camera, or of a single recording clip or photo, which may lead to uninteresting and/or corrupted video segments or photos, and may further impact the participant's ability to quickly receive, review, and/or purchase the recordings and/or photos.

During the recording of such activities, it may be beneficial to record different portions of the recreational activity or event from different angles and/or moments in time and, once the recording is completed, how to arrange the recorded footage to make a correctly ordered video and/or determine if the final video recording is compliant with one or more predetermined parameters.

Another limitation, and thereby disadvantage, of standalone recording devices (e.g., smartphones, digital cameras, etc.) is that they do not possess the computational resources (hardware or software) to record, edit, and/or compile these videos in real-time (or even near real-time). This may result in disadvantageous results for the participant-particularly when it comes to purchasing decisions and/or overall satisfaction with their experience of the indoor and outdoor recreational events and/or activities.

Thus, disclosed herein are improved systems configured to control one or more standalone recording devices and produce an auto-edited compilation of images and/or videos of recreational events and/or activities, as well as methods for operating the disclosed systems. Specifically, the example embodiments disclosed herein allow a computing device and/or system of computing devices to record different portions of a recreational activity from a number of angles and positions, as well as over different portions of a particular timeline of the recreational events and/or activities, to accurately and efficiently carry out the tasks associated with capturing, altering, and compiling of video segments and/or photos generated from live video feeds received by the computing device and/or system of computing devices into a compilation video or videos and/or photos of the recreational events and/or activities.

In operation, the systems and methods disclosed herein allow the computing system, without intervention from the participant or spectator of the recreational events and/or activities, to dynamically record the recreational events and/or activities, edit different portions of the recreational events and/or activities in real-time during the recreational events and/or activities, and quickly compile a finished video and photos of the recreational events and/or activities at the completion of the recreational events and/or activities. By doing so, the participant to focus their attention and efforts on participating in, overseeing, and/or spectating the recreational events and/or activities instead of recording it. In a further aspect, the systems and methods disclosed herein are also applicable to any recreational events and/or activities, animal and/or marine encounter events (e.g. zoos, aquariums, marine shows, and other participatory events), weddings, social events, corporate events, spectator events (e.g., sporting events), adventure tourism activities, adventure sports, amusement rides, excursion tours, or similar circumstances which involves participants and where multi-captured and multi-angle footage is of benefit for recreational events and/or activities.

For example, in one scenario, the computing device is configured to receiving user input and data associated with a recreational events and/or activities, and may do so in a number of ways. In one example, the computing device may receive data from a user of the computing device via a user interface (e.g., a videographer capturing the recreational events and/or activities with the computing), among other possibilities.

In some example embodiments, this user input and data may include the creation of one or more user profiles associated with a particular recreational activity or event (e.g., by taking a preliminary photograph of a particular participant of a particular recreational activity or event and associating and building a user profile based thereon). In a further aspect, the user input and data may further include the selection of one or more user profiles associated with the particular recreational activity or event (e.g., by selecting the preliminary photograph of a particular participant). Further, once the user profile is selected, a segment (e.g., a short video clip, photographs, etc.) of a live video feed of the recreational activity or event may be recorded. In some embodiments, there may more than one user profile created, and the selection of one or more of these user profiles may prompt one or more segments of the one or more live video feeds of the recreational activity or event may be recorded. In a further aspect, these one or more segments of the one or more live video feeds of the recreational activity or event may be transmitted to one or more components of the computing device.

In any event, once the computing device records these portions of the recreational activity or event, and in some instances in response to receiving one or more portions of the recreational activity or event, the computing device may execute an automated video processing procedure. In some embodiments, the automated video processing procedure comprises, among other elements: selecting one or more segments of a received first live video feed for further processing, wherein the one or more segments of the received live video feed are selected based on the received first user input. Furthermore, in some embodiments, the computing system may also select one or more segments of the received second live video feed for further processing, wherein the one or more segments of the received first live video feed are selected based on the received second user input, and then modify each of the one or more segments of the received first and second live video feeds to improve performance of the automated video processing procedure, all before and compiling the modified video segments into a first video of the recreational activity or event.

In some embodiments, the computing device may also generate a compiled video of the recreational activity, wherein the generated compilation video may include the modified one or more segments of the received first live video feed and the second live video feeds. In a further aspect, the modification of these segments may be based on an associated user profile (e.g., a particular participant of the recreational activity or event), the nature of the recreational activity or event (e.g., animal and/or marine encounter activities or events), environmental factors (e.g., weather conditions, geolocation data, etc.), and/or a particular compilation parameter (e.g., combining the one or more modified video segments in a particular order). In some embodiments, the compilation may also include generating a graphical representation of one or more events that occurred during the recreational activity or event (e.g., one or more graphics, including one or more graphics relating to a particular aspect of the recreational activity or event, for example, one or more animal graphics, etc.). In a further aspect, this generated graphical representation may be based on further user input or data received during the recreational activity or event, and the computing system may interleave and/or overlay the graphical representation with a least a portion of the modified one or more segments, thereby causing the first video to depict a particular representation or ordered sequence of events representative of the recreational activity or event.

Additionally or alternatively, the computing device may combine the one or more modified video segments with previously recorded stock video segments (which may include intro/outro sequences, and/or video segments of similar activities or environmental surroundings, among other possibilities) and/or stock images (e.g., a company logo and/or intro slide associated with the recreational activity or event), which may also be interleaved, potentially seamlessly, with the generated video segments and/or graphical representations, before being compiled into a video of the activity. In a further aspect, any or all of these segments (both those that are generated and those that were previously recorded) may be altered to ensure consistency across all the segments used in the compiled video of the activity. For example, the generated graphical representation may overlay the graphical representation over a video segment that includes the corresponding recreational activity, participant, or both. In a further aspect, one or both of these video segments may be altered by adjusting the playback speed of the video segments, and/or one or more of the following parameters associated with the video segments: brightness, contrast, grading, saturation, color balance, or image filter parameters. Under any of these scenarios, however, by adjusting these parameters, the computing device and/or computing system may achieve a more consistent look/visual appearance across all of the video segments, graphical representations, and/or images.

Additionally or alternatively, the computing system may combine the one or more modified video segments and/or stock video segments/images with previously recorded stock audio music, soundtracks, and/or sound effects (which may include intro/outro music, and/or sound effects for similar activities or environmental surroundings, among other possibilities), and which may also be interleaved, potentially seamlessly, with the generated video segments and/or graphical representations, before being compiled into a video of the activity. In a further aspect, any or all of these audio segments (both those that are recorded during the recreational activity or event and those that were previously recorded) may be altered to ensure consistency across all the audio segments used in the compiled video of the activity.

In other embodiments, at the completion of the activity, a copy of the video produced by the system is (or at least can be) provided to the participant, participants, or others via a variety of mediums. For example the video may be provided to one or more of these parties directly to a participant device associated with the user profile (via email or by scanning a QR code displayed on the device), on a mobile storage device (e.g., a USB flash drive, a cloud-based storage system, etc.), by uploading the video to a website or physical kiosk for review and selection, uploading the video to a social media site/service associated with one of these parties, and/or transferred to a device associated with one of these parties (e.g., a camera, smart phone, tablet or other computing device), among other scenarios.

In other examples, the computing system, while executing an automated video processing procedure related to a particular user profile for a first portion of the recreational activity or event (e.g., corresponding to a participant of the first portion of a recreational activity or event), may receive another user profile for a second portion of the recreational activity or event (e.g., corresponding to another participant of the second portion of a recreational activity or event). In response, the computing system may executes a second automated video processing procedure and may manage the received video streams and/or the steps of the first and second automated video processing steps to ensure no critical data is lost during the execution of one or both of the automated video processes. In some examples, the computing system facilitates this management by executing the first and second automated video processing procedures at the same time (e.g., by parallel processing or other similar processing techniques), and may potentially execute a third, fourth, fifth, or more automated video processing procedures in a similar fashion.

The embodiments described herein that are configured to select and process live video feeds from a computing device without participant intervention have multiple advantages over alternative procedures that may include collecting and processing video footage captured and operated by one or more participants.

For example, because this process is occurring while the participant is engaged in the recreational activity or event, the computing system may be undertaking the video processing procedure and then, based on the participant finishing the activity, cease recording any video segments and finish the video compilation at the same (or substantially the same) time.

In a further aspect, if for sale, the participant may be more inclined to purchase a finalized video that is immediately available after completing the activity because the participant is still is still engaged in the moments of excitement immediately following the activity, which may diminish quickly. Additionally, such an inclination for purchasing the finalized video benefits the user (and any associated parties) as well as the participant (e.g., if excited about the finalized video, the participant may be more likely to buy other related products from the user, submit positive reviews concerning their impressions of the activity and/or the user, upload/post the finalized video on social media sites (thereby promoting the activity and/or the user, among other such possibilities).

Other advantages of the systems and methods disclosed herein will become apparent to those of skill in the art upon review of the figures and following detailed description.

II. System Architecture

In the following sections, references will be made, in some detail, to various embodiments of the systems and methods disclosed herein. Although the following detailed descriptions provide many details to provide a context to ensure a full understanding of the present disclosure for the reader, these descriptions should not be viewed as limitations. Further, the disclosed systems and methods may be accomplished without all of these specific details.

FIG. 1 shows a system 100, in accordance with example embodiments. More specifically, system 100 includes a computing device 102 that includes a camera 104 and a controller 106, in communication with a computing system 112 via a source network 110 and one or more destination devices 120 in communication with the computing system 112 via a distribution network 118. In a further aspect, in this example, computing system 112 includes a video processing engine 108, a stock media library 114 and a media database 116. In some example embodiments, controller 106 and video processing engine 108 may be part of different computing devices (e.g., a Microsoft® Surface Go® may serve as the controller 106 and the video processing engine 108 may be part of a cloud-based server or other computing architecture, etc.). In some example embodiments, controller 106 and video processing engine 108 may be part of a discrete computing device (e.g., a Microsoft® Surface Go®, an iPad®, etc.). Furthermore, in some embodiments, one or more of these components, including those of computing device 102, may be encased in one or more specifically configured enclosures.

In some embodiments, camera 104, controller 106, and/or more other components of computing device 102 (such as those discussed below in connection with FIG. 2) comprise one or more processors programmed with the software that, when executed by the one or more processors, causes or otherwise enables the computing device 102 to communicate with and/or control one or more other components in computing device 102, computing system 112, and/or other components in system 100. For example, in some embodiments, controller 106 includes a user interface that communicates with camera 104 and, in response to receiving input from a user viewing a live feed from camera 104 via the user interface, communicates with the camera 104 to take one or more actions (e.g. record a certain portion of the live video feed).

In some embodiments, in response to receiving user input, controller 116 selects one or more video segments or images from the live video feeds received from camera 104. In operation, controller 106 can communicate with the camera 104 in one or more of a variety of ways. For example, in some embodiments, camera 104 may be a digital single lens reflex (DSLR) camera, a compact digital camera, a mirrorless digital camera, a high definition action camera (e.g. a GoPro® camera), and/or a smartphone camera, among other possibilities. In examples, this communication between the controller 106 and the camera 104 may be accomplished via wired connections (e.g., High-Definition Multimedia Interface (HDMI) cables, coaxial cables, Ethernet cables, or any other suitable wireline communication technology now known or later developed) and/or wireless connections (e.g., WIFI, VHF or UHF radio frequencies, or other suitable wireless technologies now known or later developed), among other possibilities.

In examples, the controller 116 may directly control the camera 104 to capture or take other actions in connection with a live video feed from the camera to the controller to the at particular times. In yet another example, each camera may be configured to transmit a live video feed via a wireless or wireline network to the controller 106 on a separate physical or virtual channel (e.g., a separate RF channel in a frequency division multiplexed (FDM) scheme, a separate time slot channel in a time division multiplexed (TDM) scheme, a separate source IP address, e.g., the camera's IP address, in a video over IP scheme) and the controller is configured to tune or otherwise configure a physical or virtual receiver (not shown) of the computing device 102 to receive, review, control, and process the live video feed at a particular time.

In a further aspect, in order to determine which one or more live video feeds captured by camera 104 are selected for further processing, the controller 116 in some embodiments relies on information received from a user of computing device 102 (e.g., via a user interface), a set of predetermined instructions (e.g., a script that the processors of the controller execute), and/or other input data.

For example, in some embodiments, in response to receiving user input (e.g., via a user interface of controller 106), the computing device 102 may execute an automated (or at least semi-automated) video processing procedure. In other embodiments, however, the computing device 102 may execute, continue, and/or cease an automated (or at least semi-automated) video processing procedure in response to receiving user input via controller 106. In other embodiments, the computing device 102 may receive this input wirelessly (e.g., broadcasting over WiFi), from one or more wired devices, and/or other devices and/or technologies.

In still other embodiments, once the one or more segments of the received live video stream feeds are selected for processing via the controller 106, those segments are received by a video processing engine 108 that processes the received segments in one or more ways. In one example, the video processing engine modifies the selected segment(s) to improve the performance of the computing system in connection with performing the automated video processing procedure. In some embodiments, this modification may include, among other possibilities, compressing the selected segment(s) to reduce the processing load for generating the compiled video, among others.

In a further aspect, once a selected segment has been modified, the video processing engine 108 generates one or more video segments based on one or more of the modified video feeds, which may include a variety of video processing techniques (e.g., recording the video segment in real time and saving it in one or more formats).

In a further aspect, video processing engine 108 may use user input from controller 106 to analyze the video segments and/or further influence how the video segments are modified and/or compiled. For example, video processing engine 108 may use user input to select and/or modify video segments so that the one or more particular event participants (e.g., a first recreational activity participant) are in a particular compilation video (e.g., a first compilation video associated with a first a first recreational activity participant and/or first user profile). In another example, video processing engine 108 may use the user input to select and/or modify video segments so that the one or more particular event participants (e.g., a first recreational activity participant) are in a particular compilation video (e.g., a first compilation video associated with a first a first recreational activity participant and/or first user profile) and disregard any video segments that do not include the particular event participant. Other examples are possible.

In yet another aspect, video processing engine 108 compiles the one or more generated video segments into a video of the recreational events and/or activities in a variety of ways.

For example, in some embodiments, video processing engine 108 compiles the one or more generated video segments into the video of the activity by combining the one or more generated video segments into the video of the activity with no further editing or input.

In other embodiments, however, video processing engine 108 generates a graphical indication of one or more events that occurred during the recreational events and/or activities. In some embodiments this graphical representation may include and/or be based on user input and/or other factors (e.g. geographic location data) received during the recreational events and/or activities. These graphical representations may include graphics indicating the particular recreational events and/or activities recorded by the computing device 102 (e.g., a title slide indicating one or more aspects of a live video feed recorded of an animal and/or marine encounter event and/or activity). In a further aspect, video processing engine 108 may overlay and/or interleave the generated graphical representation with the modified video segments, and then compile both the generated graphical representations and generated video segments into the video of the recreational events and/or activities.

In other embodiments, the video processing engine 108 may communicate with a computing system 112 (e.g., a cloud-based server) to retrieve and/or select one or more stock video segments from stock media library 114 (which may not be stored locally on the computing device 102), interleave the selected stock video segments with the generated video segments, and then compile both the stock and generated video segments into the video of the activity.

In some embodiments, the computing device 102 (or one or more components thereof, for example, controller 106 and/or video processing engine 108) selects the stock video segments based on data detected concerning the operational parameters and/or environmental factors detected by the computing device during the recreational activity or event. For example, the computing system may detect information regarding one or more relevant factors concerning system 100 (e.g., current weather conditions or other environmental information), which may influence the video processing engine's selection of the stock video segments (e.g., if it is cloudy/overcast, the video processing engine may select only the stock video segments that reflect cloudy/overcast conditions).

In further examples, video processing engine 108 may also alter the generated graphical representations, selected stock video segments, the modified video segments, or both, to achieve a consistent look across the compiled video. For example, if it is rainy and overcast during the recreational events and/or activities, the computing system may modify the selected live and/or stock video segments, generate graphical representations of the recreational events and/or activities reflecting the conditions, or both, among other possibilities.

In a further aspect, once the video of the recreational events and/or activities has been completed and the video is ready to be transferred, the video may be sent (via source network 110, the video processing engine 108, and/or the controller 106) to the media database 116. In one example, media database 116 may serve as both a repository for finished videos (e.g., a storage device for such videos), output interface (e.g., network interface), or both. In a further aspect, the media database 116 may also facilitate communication between one or more destination devices 120 and the computing system 112 via a distribution network 118. Additionally, media database 116 may also facilitate communication between one or more destination devices 120 and the computing device 102 via distribution network 118 and source network 110. Additionally, although not specifically illustrated in FIG. 1, once a compilation video is complete ready for distribution to one or more destination devices 120, distribution network 118 may communicate with computing device 102 (e.g., via source network 110 or directly with computing device 102) to retrieve and/or otherwise receive the completed compilation video for distribution.

Under either scenario, in example embodiments, similar to communications via source network 110, communications with the one or more destination devices 120 (e.g., mobile devices, computing devices, kiosks, and/or other devices associated with the user, the participant, or another party) via the distribution network 118 may be accomplished in a variety of ways (e.g., via wired, wireless, and/or other transmission technologies). In some embodiments, the video may transferred to a SD/USB medium or other tangible memory media. In other embodiments, the video may be uploaded to a website for later download by a party, such as the activity participant. In other embodiments, the video may also be transferred via distribution network 118 to a participant's portable electronic device (e.g., camera, smart phone, tablet computer, or other portable electronic device).

III. Computing Device

Figure 2:
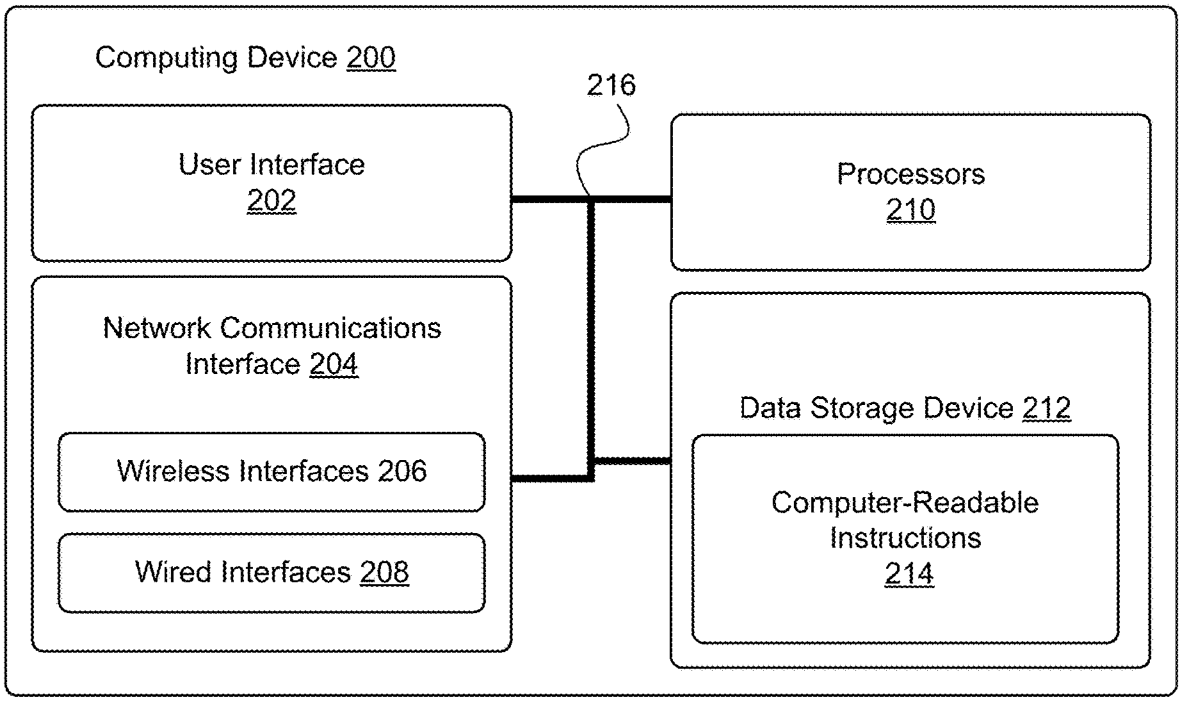
FIG. 2 depicts an example computing device, in accordance with example embodiments.

FIG. 2 illustrates computing device 200 in accordance with example embodiments, which may be configured to perform at least the functions of computing device 102, as previously described.

Computing device 200 includes one or more user interfaces 202, a network-communication interface 204 (comprising one or more wireless interfaces 206 and/or wired interfaces 208), one or more processors 210, and a data storage device 212 with computer-readable instructions 214 stored thereon, all of which may be linked together by a connector 216, such as a system bus or similar mechanism.

In operation, the user interface 202 (described above in connection with, at least controller 106) may be configured to receive and/or convey information and/or data to/from a user. In one example, the user interface 202 is a touch screen that displays one or more graphical user interfaces to receive and convey information from and to the user. In other examples, the user interface 202 receives information and/or data from a user through the use of a computer mouse, a keyboard, one or more cameras, and/or one or more microphones (which may also work in connection with voice recognition software), among other such devices. In other examples, the user interface 202 is configured to convey information and/or data to a user through the use of display devices (which may include LCD, LED, and/or plasma, among other, screens, and/or other similar devices, either now known or later developed) and/or speakers (or an audio output port configured to send an audio signal to an external device), among other similar devices.

Computing device 200 also includes one or more network-communications interfaces 204, which may comprise one or more wireless interfaces 206 and/or one or more wired interfaces 208, both or either of which may be configured to communicate via a network. For example, wireless interfaces 206 may include wireless receivers, wireless transmitters, and/or wireless transceivers, one or more of which may employee technologies such as Bluetooth, WIFI, and/or other similar types of similar technologies. In other examples, wired interfaces 216 may include one or more wired receivers, wired transmitters, and/or wired transceivers, one or more of which may employee technologies such as coaxial, Ethernet, USB, and/or other similar types of similar technologies.

In some example embodiments, the wired interfaces 208 include one or more HDMI interfaces, where each HDMI interface is configured to receive a live video feed from camera 104 shown and described in FIG. 1.

Computing device 200 also includes one or more processors 210, which are configured to execute computer-readable program instructions 214 that are contained in data storage 212 and/or other instructions as described herein. In operation, the one or more processors 210 are configured to execute the software for controlling the other components of a computing system (e.g., video processing engine 108, described in further detail herein).

Computing device 200 also includes one or more data storage devices 212, one or more of which may include one or more computer-readable storage media that can be read and/or accessed by the at least one or more processors 210. In a further aspect, one or more data storage devices 212 can also contain, among other data, computer-readable program instructions 214. And, in some embodiments, data storage device 212 can additionally include instructions required to perform at least part of the methods and method steps described herein (e.g., the method steps and/or other functionality of video processing engine 108, as described in further detail herein). In some embodiments, the one or more data storage devices 212 are also configured to store (at least temporarily) one, more, or all of the received live video feeds from the camera 104, the video segments derived from the live feeds, the generated graphical representations, the stock media library, altered stock and/or modified video segments, and compiled videos generated by the computing device 102.

IV. Recording and Editing Computing Device and Architecture

In the following sections, references will be made, in some detail, to various embodiments of the systems and methods disclosed herein. Although the following detailed descriptions provide many details to provide a context to ensure a full understanding of the present disclosure for the reader, these descriptions should not be viewed as limitations. Further, the disclosed systems and methods may be accomplished without all of these specific details.

Figure 3A:
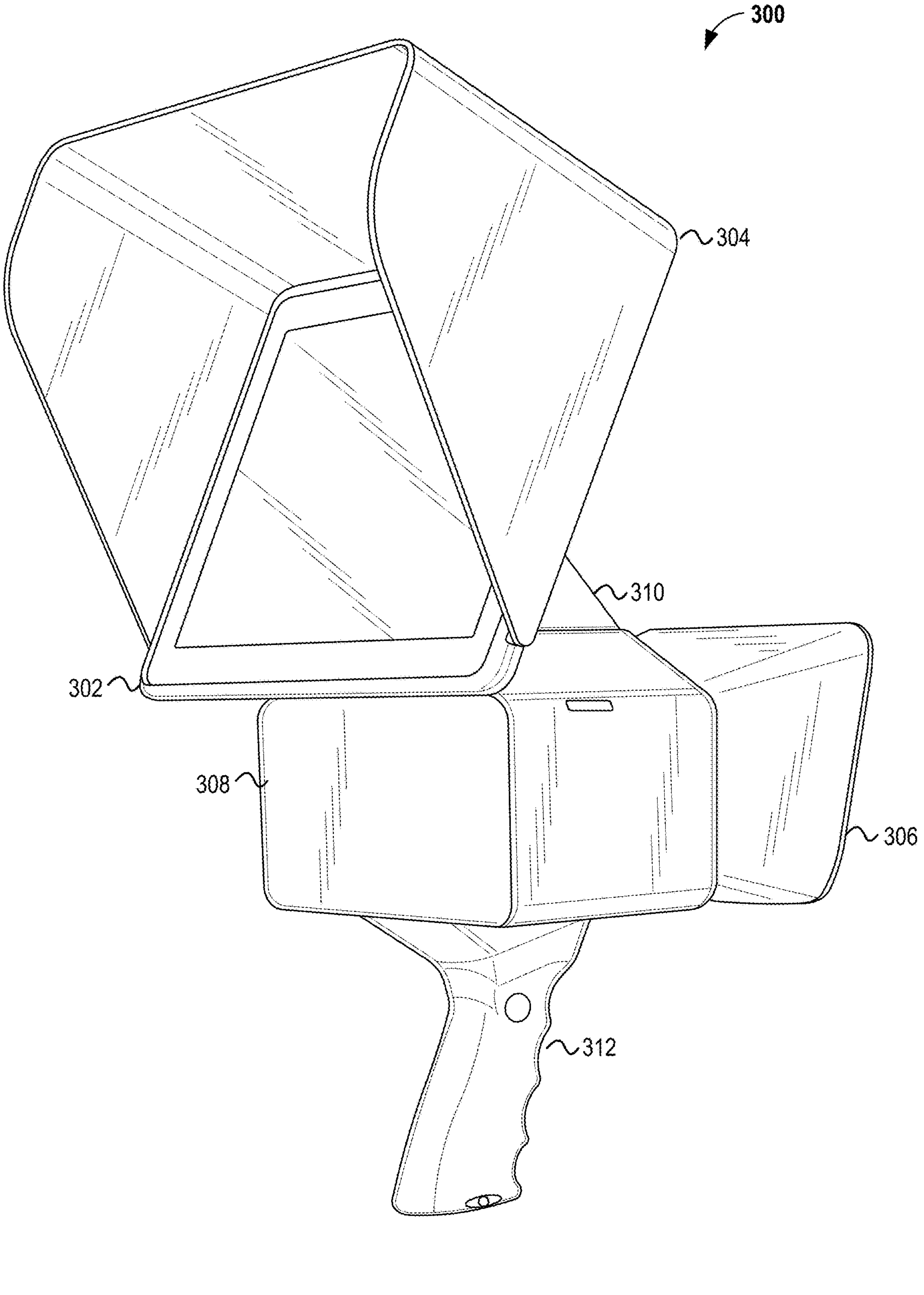
FIG. 3A depicts an example computing device and architecture, in accordance with example embodiments.

FIG. 3A shows a first perspective view of a computing device 300, in accordance with example embodiments. More specifically, computing device 300 includes a controller 302 in communication with a computing system (e.g., via a source network), a first enclosure 304, a camera 306, a second enclosure 308, a connection enclosure 310, and a filming grip handle 312. In a further aspect, in this example, controller 302 communicates with additional computing devices and/or computing systems (including a video processing engine, stock media library and a media database). In FIG. 3A, controller 302 is illustrated as a discrete computing device (e.g., a Microsoft® Surface Go®, an iPad®, etc.). Furthermore, in the illustrated embodiment, illustrated components, including those of computing device 102, may be encased in one or more specifically configured enclosures, including first enclosure 304, second enclosure 308, and connection enclosure 310.

For example, in FIG. 3A, controller 302 includes a user interface that is covered (or at least partially covered) by first enclosure 304. In some example embodiments, first enclosure 304 improves the user's view of and/or interaction with the displayed content on the user interface of controller 302, protects controller 302 (e.g., against adverse weather conditions), and/or, provides a heat sink and/or cooling benefits to controller 302 (e.g., via thermally conductive materials, via perforations in the enclosure, etc.), among other improvements. In a further aspect, computing device 300 improves a user's ability to interact with controller 302 and communicate with a camera of computing device 300 (e.g., in response to receiving input from a user viewing a live feed from camera via the user interface and communicating with the camera to take one or more actions (e.g. record a certain portion of the live video feed)). Other examples are possible.

For example, in FIG. 3A, computing device 300 includes a camera that is covered (or at least partially covered) by second enclosure 308. In some embodiments, the camera may be a digital single lens reflex (DSLR) camera, a compact digital camera, a mirrorless digital camera, a high definition action camera (e.g. a GoPro® camera), and/or a smartphone camera, all encased (or at least partially encased) in second enclosure 308, among other possibilities. In some example embodiments, second enclosure 308 improves the user's view of and/or interaction with the content that is received by the camera (and ultimately displayed on the user interface of controller 302) by providing one or more filters or additional lens in front of the lens of the camera of computing device 300. In a further aspect, the second enclosure 308 protects the camera (e.g., against adverse weather conditions), and/or, provides a heat sink and/or cooling benefits to the camera, among other improvements. In a further aspect, computing device 300 improves a user's ability to interact with and communicate with the camera of computing device 300.

In examples, as illustrated in FIG. 3A, computing device 300 includes connection mechanisms between various components (including the controller and camera) that are covered (or at least partially covered) by connection enclosure 310. As described in further details above, this communication between the controller and the camera may be accomplished via wired connections (e.g., High-Definition Multimedia Interface (HDMI) cables, coaxial cables, Ethernet cables, or any other suitable wireline communication technology now known or later developed) and/or wireless connections (e.g., WIFI, VHF or UHF radio frequencies, or other suitable wireless technologies now known or later developed), among other possibilities. In some example embodiments, connection enclosure 310 improves the user's interaction with the connection components and protects the connection components (e.g., against adverse weather conditions), and/or, provides a heat sink and/or cooling benefits to the connection components, among other improvements. In a further aspect, computing device 300 improves a user's ability to interact with the connection components of computing device 300 (e.g., by providing an ordered structure to contain and organize the connection components. Other examples are possible In examples, as illustrated in FIG. 3A, computing device 300 includes filming grip handle 312, which allows the user of computing device 300 to more effectively interact with and utilize the various components of computing device 300 (including the controller and camera) by stabilizing, angling, and/or focusing the various components of computing device 300. In a further aspect, although not specifically illustrated in FIG. 3A, one or more straps may be used in addition or alternatively to filming grip handle 312 to help provide stabilizing, angling, and/or focusing the various components of computing device 300.

Figure 3B:
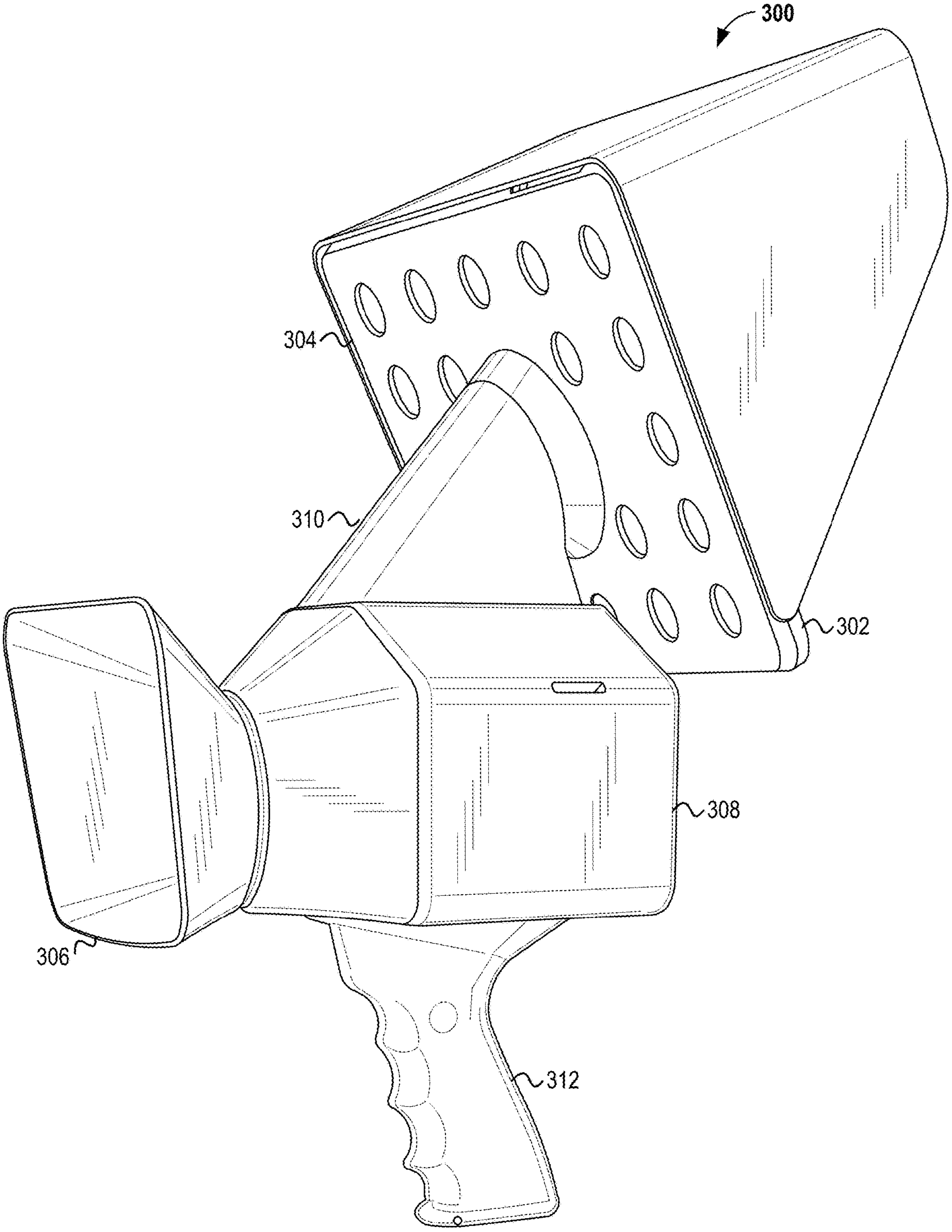
FIG. 3B depicts the example computing device and architecture of FIG. 3A, from a second perspective.
Figure 3C:
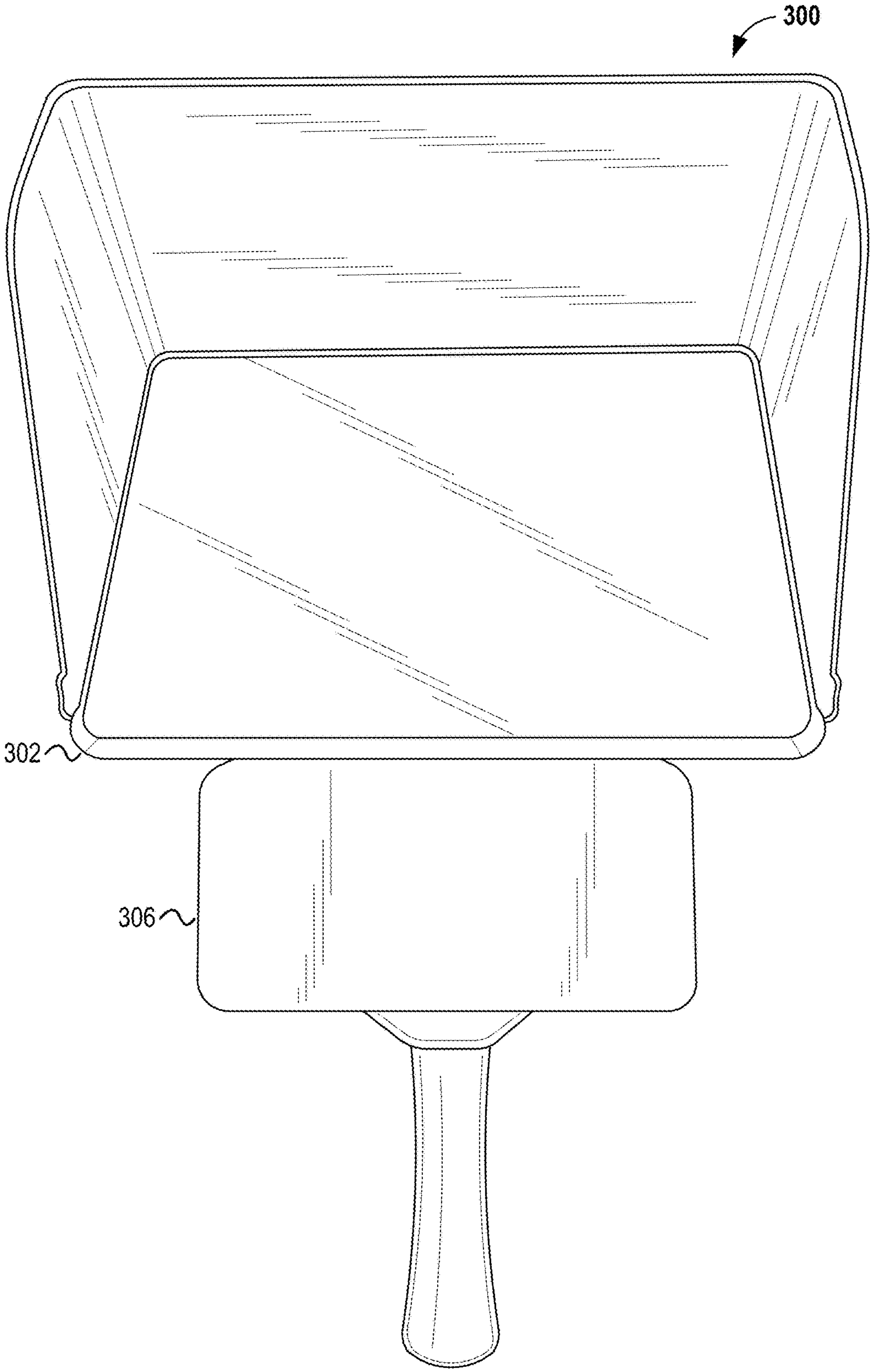
FIG. 3C depicts the example computing device and architecture of FIGS. 3A and 3B, from a third perspective.

FIGS. 3B and 3C show a second and third perspective view of the computing device 300 of FIG. 3A, in accordance with example embodiments. More specifically, FIG. 3B illustrates, among other features, the perforations of first enclosure 304, a more detailed view of connection enclosure 310, a camera lens portion of second enclosure 308 (e.g., where the lens of camera 306 would be pointed), as well as other illustrated components, and approximate dimensions and configurations thereof. FIG. 3C illustrates, among other features, a third perspective of the computing device 300, approximately from the user's perspective as it relates to controller 302 and/or camera 306.

Figure 4:
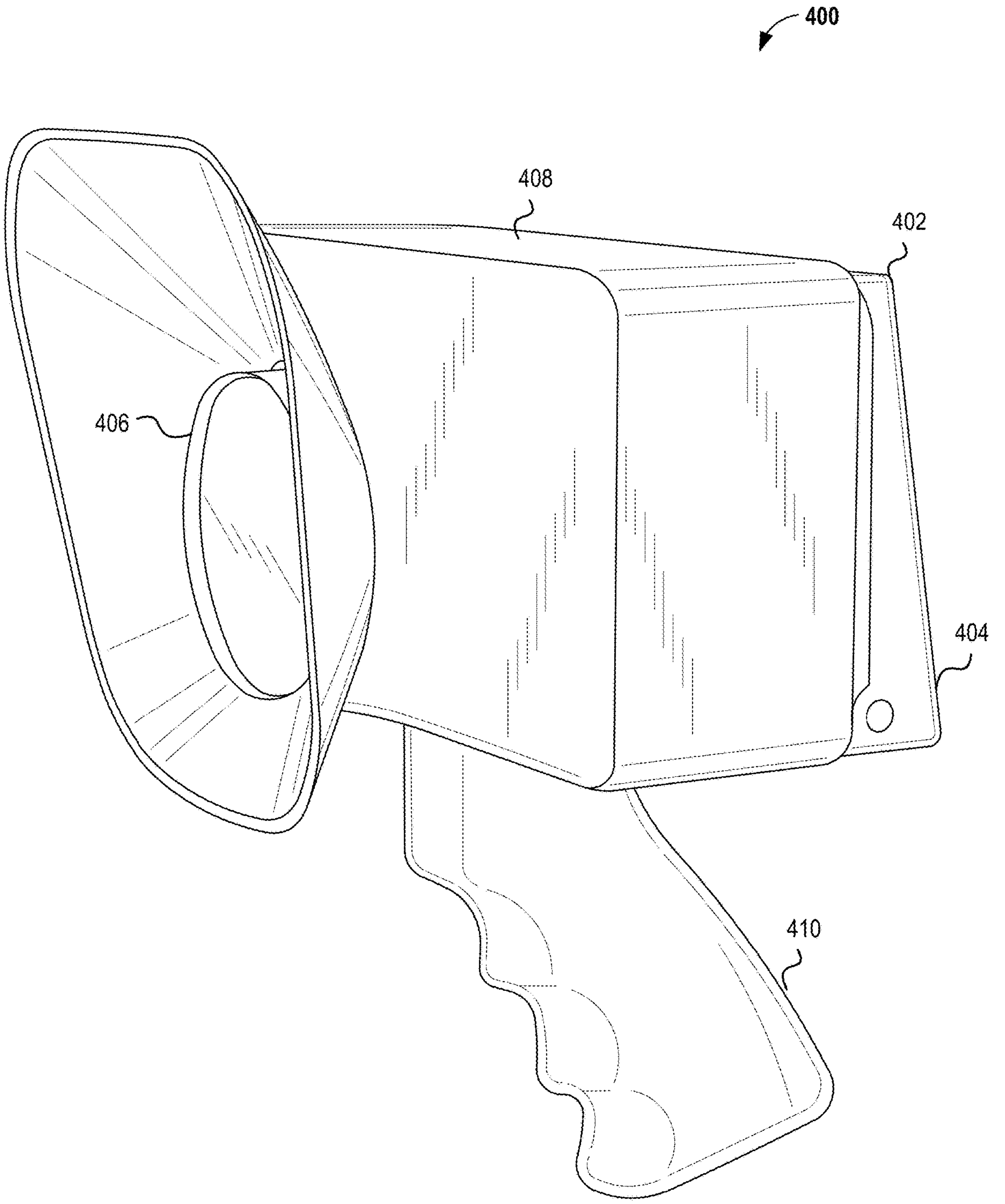
FIG. 4 depicts an example computing device and architecture, in accordance with example embodiments.

FIG. 4 shows a computing device 400, in accordance with example embodiments. More specifically, computing device 400 includes a controller 402 that is in communication with a computing system (e.g., via a source network), a first enclosure 404, a camera 406, a second enclosure 408, and a filming grip handle 410. In a further aspect, like FIGS. 3A-3C, controller 402 communicates with additional computing devices and/or computing systems (including a stock media library and a media database). In FIG. 3A, controller 302 includes, at least, a controller and video processing engine and is illustrated as a discrete computing device (e.g., a Microsoft® Surface Go®, an iPad®, etc.). Furthermore, in the illustrated embodiment, illustrated components, including those of computing device 102, may be encased in one or more specifically configured enclosures, including first enclosure 404 and second enclosure 408, which also may be used to protect controller 402, camera 406, connection mechanisms between controller 402 and camera 406 (among other components) among other possibilities.

C. Example Graphical User Interfaces

For example, to further illustrate the above-described concepts and others, FIGS. 5A-5F depict graphical user interfaces, in accordance with example embodiments. Although illustrated in FIGS. 5A-5F as being displayed via an application 502 associated with a computing device and/or computing system, such as those illustrated and detailed in connection with FIGS. 1, 2, 3, and 4. Although this application 502 is illustrated as displaying via a graphical user interface of a mobile computing device (e.g., computing device 200, computing device 300, computing device 400), this application may be provided for display by one or more components of the computing system 100 (including destination devices 120), among other possibilities.

The information displayed by the graphical user interfaces may also be derived, at least in part, from data stored and processed by the components described in connection with the computing system 100, computing device 102, 200, 300 and/or 400, and/or other computing devices or systems configured to generate such graphical user interfaces and/or receive input from one or more users (e.g., those described in connection with, at least, the components of FIGS. 1, 2, 3 and 4). In other words, this graphical user interface is merely for the purpose of illustration. The features described herein may involve graphical user interfaces that format information differently, include more or less information, include different types of information, and relate to one another in different ways.

Turning to FIGS. 5A-5F, FIG. 5A depicts an example graphical user interface 500 in a first state. Interface 500 includes visual representations for the user of an application 502 executing on the depicted mobile computing device and associated with a computing system (e.g., computing system 112). Interface 500 presents the user with visual indications of several components of the methods and systems described herein and actions that may be taken in response thereto.

Specifically, in the context of FIG. 3A, these visual indications include information concerning the live video feed 504 displayed to the user (shown here accompanied by "SNAP PREVIEW PHOTO") and first action icon 506 (shown here as "Create Profile"). In some embodiments, if the user selects the first action icon 506, one more actions may be taken by the computing device or computing system in response. For example, in some embodiments, if the user selects the first action icon 506, a photograph and/or short video segment may be recorded from the live video feed 504 displayed to the user. In a further aspect, this photograph and/or short video segment may be used to generate (or at least be part of) an associated user profile. Additionally or alternatively, once the user selects the first action icon 506, the computing device or computing system may undertake a calibration sequence to ensure that all photographs and/or recorded video is recorded in a consistent manner from the live video feed 504 (e.g., based on environmental conditions, the type of recreational activity that is recorded, the characteristics of stock video segments and/or graphical representations that may be used to generate a compilation video of the recorded recreational activity, etc.). Other examples are possible.

Figure 5A:
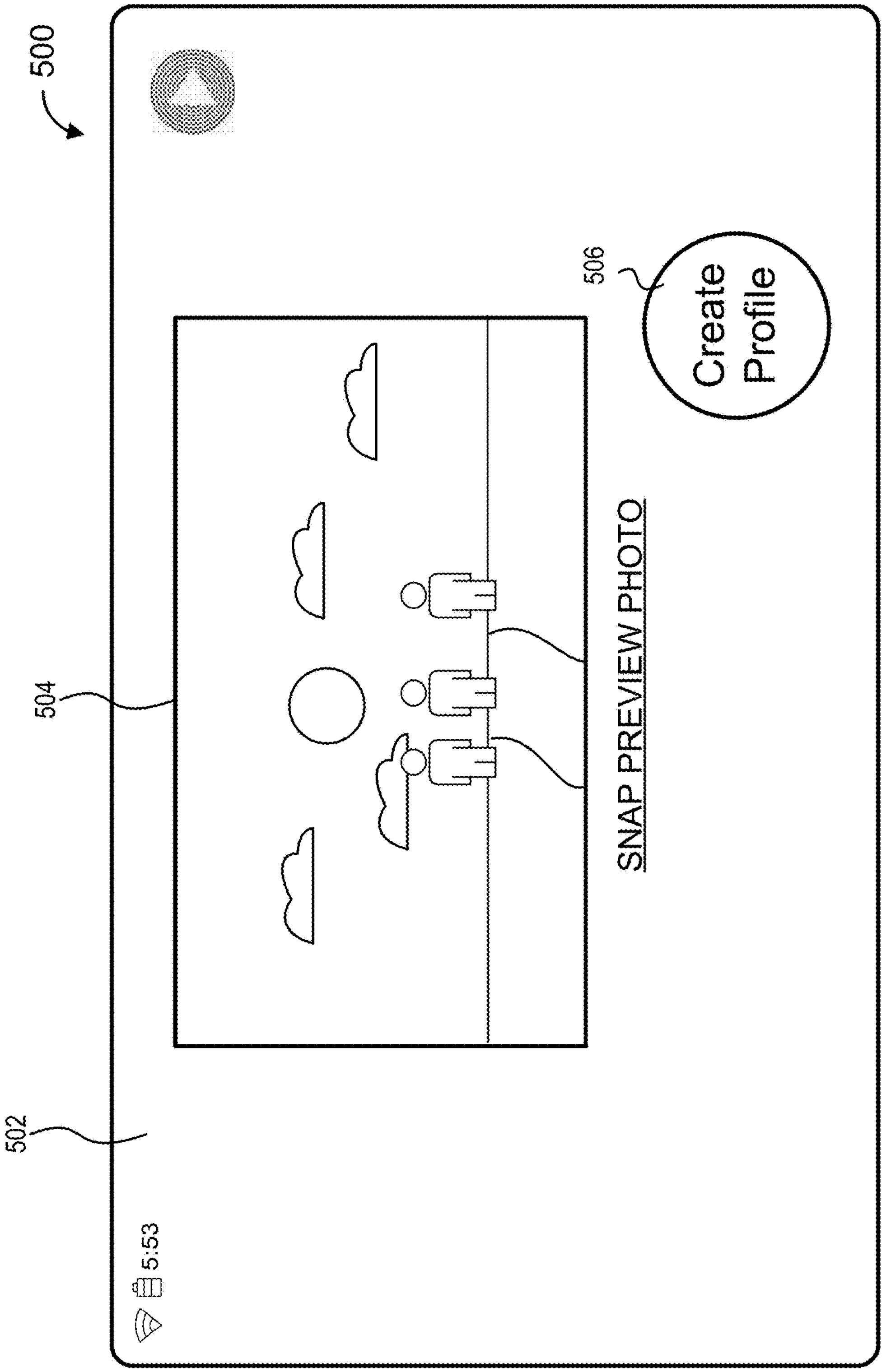
FIG. 5A depicts an example graphical user interface in accordance with example embodiments.
Figure 5B:
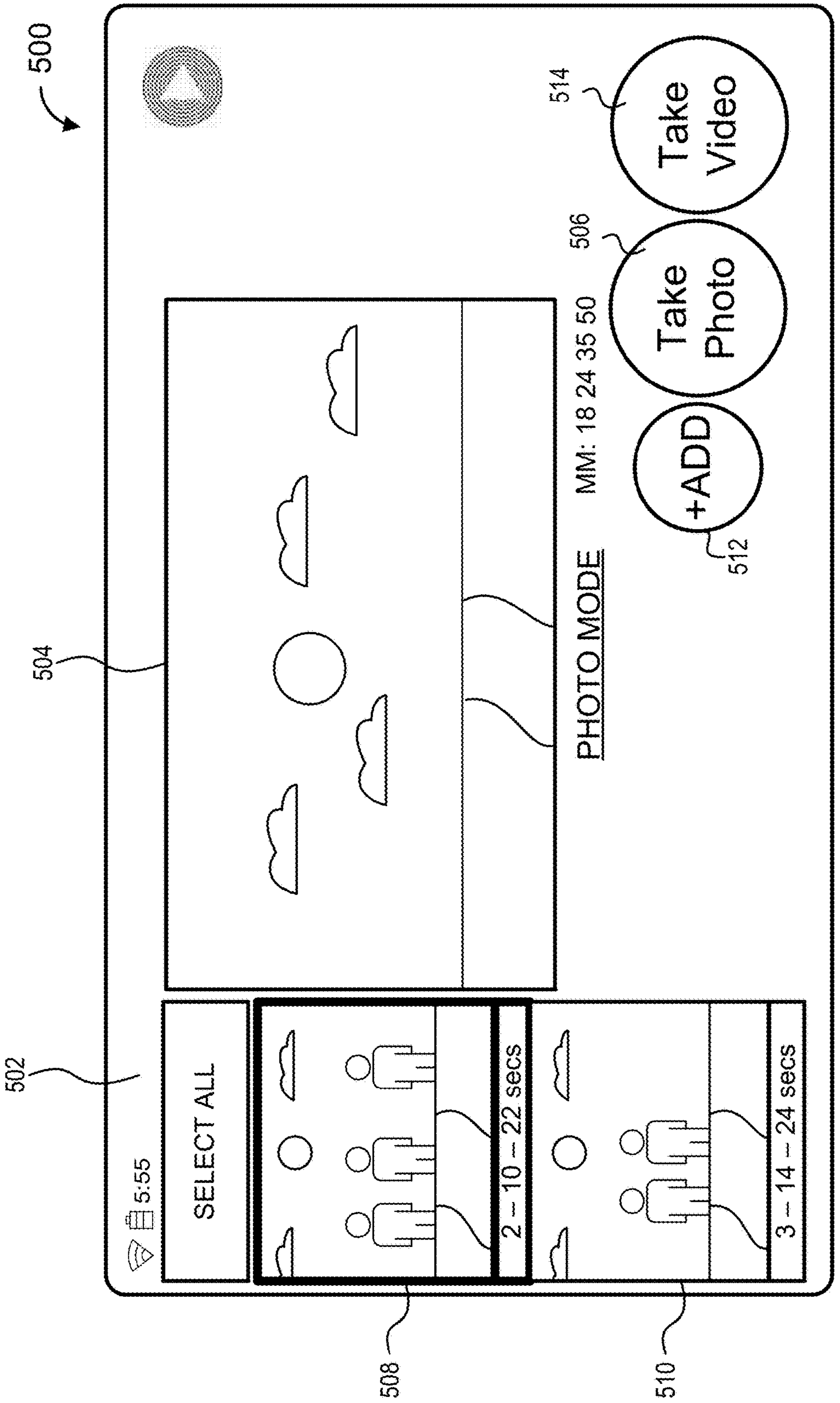
FIG. 5B depicts the example graphical user interface of FIG. 5A, in a second state, in accordance with example embodiments.

For example, similar to FIG. 5A, FIG. 5B shows the graphical user interface 500 of FIG. 4A, but in a second state that results from a user selecting first action icon 506. In the second state, because the user has selected the first action icon 506, the computing system has created a first user profile 508 and a second user profile 510, which includes information or content that is personalized for the user of the application 502, particular participants of the recreational activity, and/or associated with mobile computing devices particular participants of the recreational activity. In FIG. 3B, the first user profile 508 has been selected (e.g., by the user of the application 502 and/or interface 500) and interface 500 now displays a photography mode associated with the live video feed 504 (shown here as "PHOTO MODE" and parameters associated with the photography mode, including a selectable focal length "MM: 18 24 35 50") and additional information and prompts that are specifically tailored to the user via first action icon 506 (shown here as "TAKE PHOTO"), as well as user profile icon 512 (shown here as "+ADD") and second action icon 514 (shown here as "TAKE VIDEO"). In example embodiments, once the user selects first action icon 506, one or more photographs are captured from the live video feed 504 and associated with the selected first user profile 508.

In a further aspect, in example embodiments, each of first user profile 508 and second user profile 510 display a photograph or short video associated with a particular participant or group of participants and each of the first user profile 508 and second user profile 510, as well information indicating the total number of photographs and/or video that has been captured in connection with first user profile 508 and second user profile 510. Once the user selects a particular user profile or group of user profiles, any action taken by the for first action icon 506 and second action icon 514 will be associated with and/or stored in connection with the selected user profile or group of user profiles. For example, in FIG. 5B, because user profile 508 has been selected, if a photograph is captured via live video feed 504 (e.g., because the user selects first action icon 506 ("Take Photo")), then the captured photograph is associated with and/or stored in connection with the first user profile 508. Additionally or alternatively, if the user selects all of the displayed user profiles (e.g., by selecting the "SELECT ALL" icon), then any photograph captured thereafter via live video feed 504 is then associated with and/or stored in connection with all displayed user profiles (here the first user profile 508 and the second user profile 510). Other examples are possible.

For example, as shown in FIG. 5B, if the user selects user profile icon 512, a photograph and/or short video segment may be recorded from the live video feed 504 used to generate (or at least be part of) an additional user profile. In a further aspect, as shown in FIG. 5B, if the user selects second action icon 514, another mode of the interface 500 and/or application 502 may be engaged. For example, if the user selects second action icon 514 (shown here as "Take Video"), interface 500 and/or application 502 might switch to a videography mode.

Figure 5C:
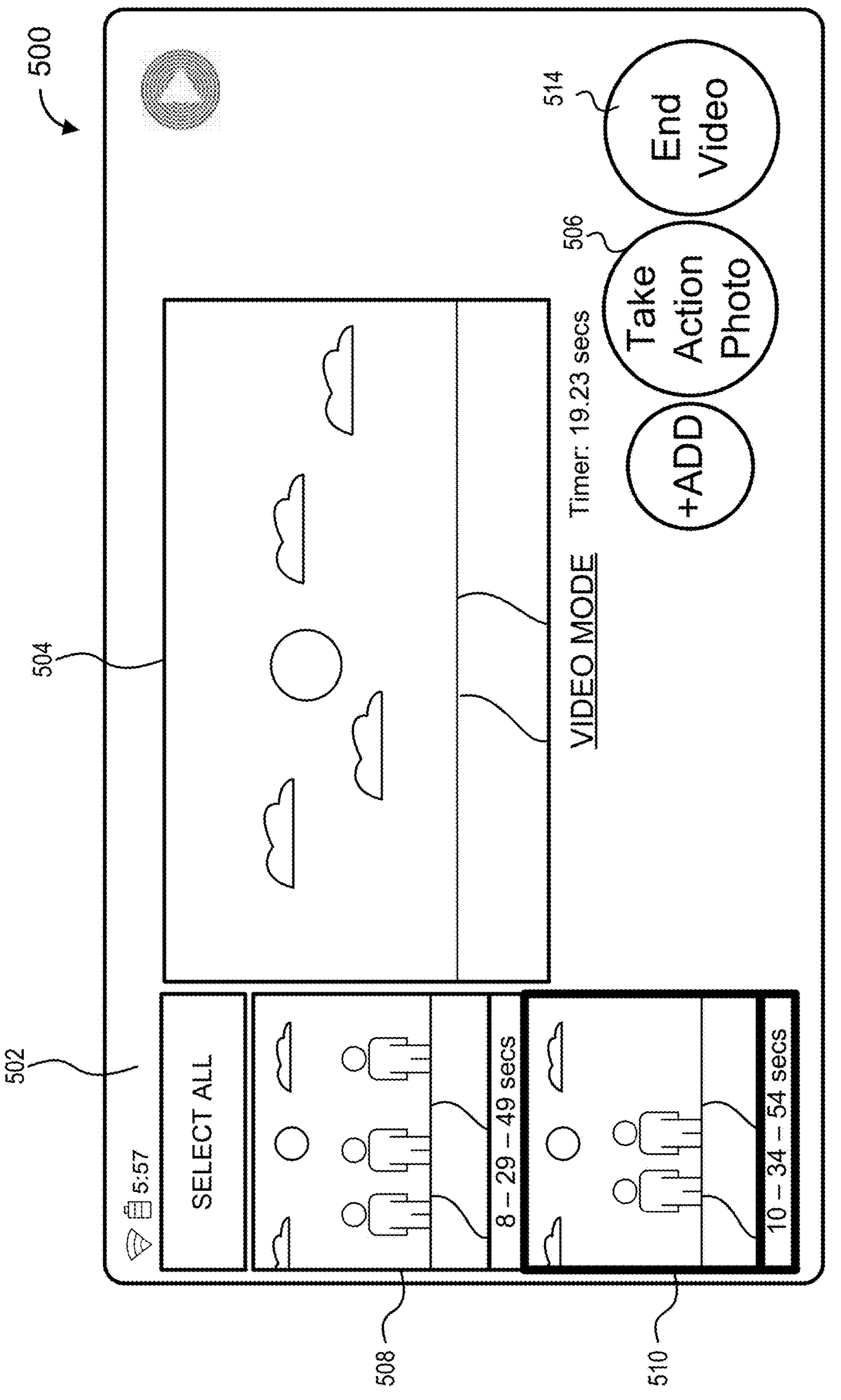
FIG. 5C depicts the example graphical user interface of FIGS. 5A and 5B, in a third state, in accordance with example embodiments.

Turning to FIG. 5C, the second user profile 510 has been selected (e.g., by the user of the application 502 and/or interface 500) and interface 500 now displays a videography mode associated with the live video feed 504 (shown here as "VIDEO MODE" and parameters associated with the videography mode, including the length of the video captured so far during this particular video capture "19.23 secs") and additional information and prompts that are specifically tailored to the user via first action icon 506 (shown here as "TAKE ACTION PHOTO") and second action icon 514 (shown here as "END VIDEO"). In example embodiments, once the user selects first action icon 506, one or more photographs are captured from the video currently being recorded (captured) by the computing device of the live video feed 504 displayed on the computing device. As further detailed herein, these photographs are referred to as "action photographs" (i.e., photographs that are captured from a video being recorded by the computing device), all of which will be associated with the selected second user profile 510.

In a further aspect, in example embodiments, because second user profile 510 has been selected, all video captured and if any action photographs are captured via live video feed 504 (e.g., because the user selects first action icon 506 ("Take Action Photo")), then the captured video and any action photographs are associated with and/or stored in connection with the second user profile 510. Additionally or alternatively, as described above, if the user selects all of the displayed user profiles (e.g., by selecting the "SELECT ALL" icon), then any video and any action photographs captured thereafter via live video feed 504 are then associated with and/or stored in connection with all displayed user profiles (here the first user profile 508 and the second user profile 510). Other examples are possible.

For example, as shown in FIG. 5C, if the user selects second action icon 514, another mode of the interface 500 and/or application 502 may be engaged. For example, if the user selects second action icon 514 (shown here as "End Video"), then the computing device will cease recording the video currently displayed by the live video feed 504, and interface 500 and/or application 502 might switch to a different view or mode (e.g., back to photography mode).

Figure 5D:
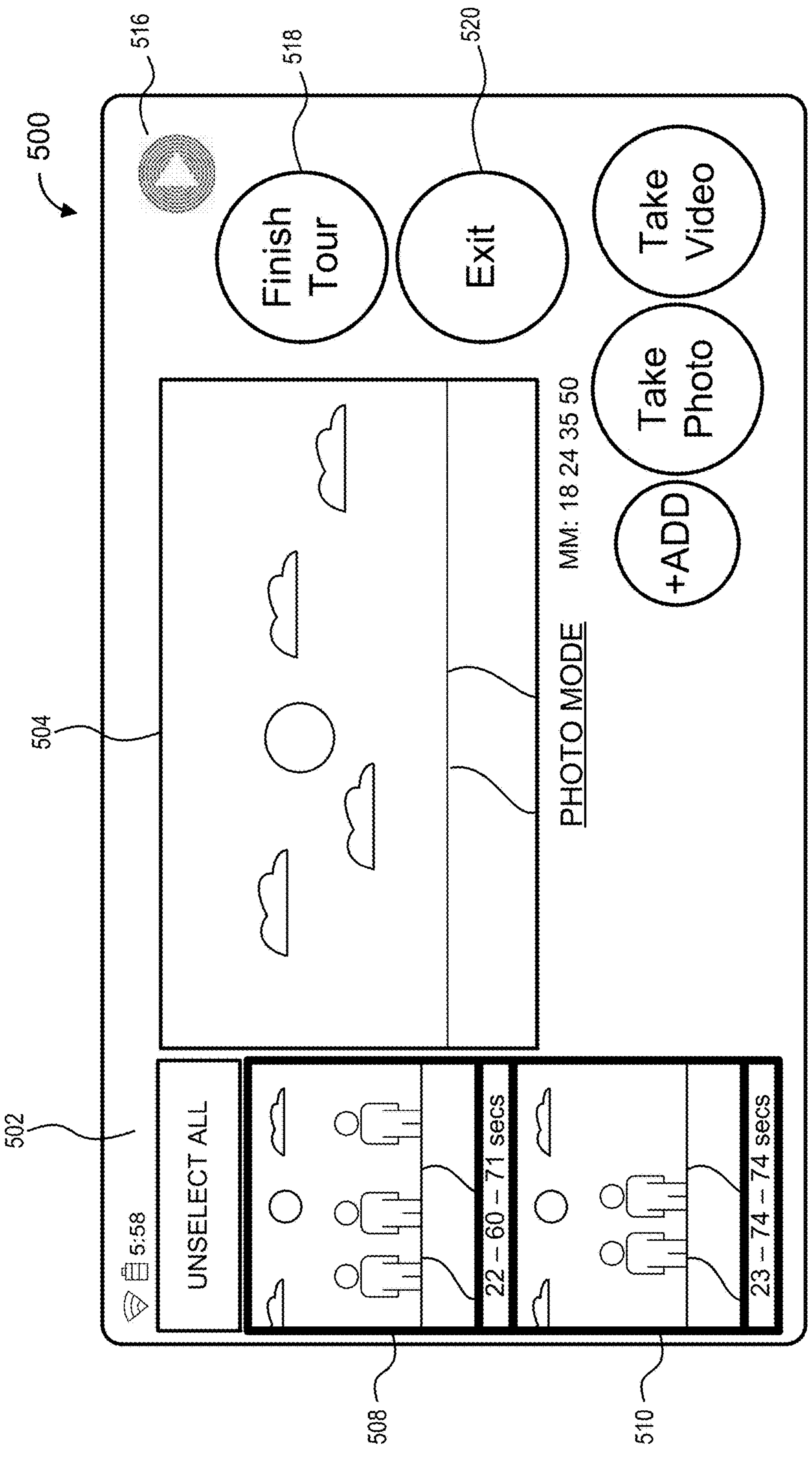
FIG. 5D depicts the example graphical user interface of FIGS. 5A, 5B, and 5C in a fourth state, in accordance with example embodiments.

Turning to FIG. 5D, interface 500 and/or application 502 has switched back to photography mode, both of the first user profile 508 and second user profile 510 have been selected (e.g., by the user of the application 502 and/or interface 500). As also shown in FIG. 5D, because both the first user profile 508 and the second user profile 510 are currently selected the previous "SELECT ALL" icon has become an "UNSELECT ALL" icon. Additionally, as shown in FIG. 5D, third action icon 516 has been selected, which has caused interface 500 and/or application 502 to display compilation icon 518 (shown here as "Finish Tour") and exit icon 520, which provide additional information and prompts that are specifically tailored to the user via third action icon 516.

In example embodiments, once the user selects the compilation icon 518 and one or more user profiles, then the one or more photographs, action photographs, and/or video recordings captured from the live video feed are used to generate a compilation video captured by the computing device from the live video feed 504 displayed on the computing device. As further detailed herein, this compilation video will be associated with the selected user profiles. As shown in FIG. 5D, additional information may be displayed which provides the user more insight on the video compilation process and procedures.

For example, as shown in FIG. 5D, this information may include "22-60-71 secs" for the first user profile 508 and "23-74-74 secs" for the second user profile 510, which indicates "[number of photographs captured in PHOTO MODE]-[number of photographs captured in VIDEO MODE (referred to herein as "Action Photos")]-[number of seconds of video captured in VIDEO MODE]" in connection with each of the first user profile 508 and second user profile 510. Thus, as illustrated in FIG. 5D, for the first user profile 508: 22 photographs have been captured in PHOTO MODE, 60 photographs have been captured in VIDEO MODE, and 71 seconds of video have been captured in VIDEO MODE. Thus, as illustrated in FIG. 5D, for the second user profile 510: 23 photographs have been captured in PHOTO MODE, 74 photographs have been captured in VIDEO MODE, and 74 seconds of video have been captured in VIDEO MODE. Other examples are possible.

For example, based on the user selecting the compilation icon 518, the computing device displaying user interface 500 and/or executing application 502, may execute an automated video processing procedure to generate the compilation video associated with the one or more selected user profiles, and may do so in a number of ways.

For example, in some embodiments, the compilation video may be compiled (e.g., by video processing engine) using the one or more photographs, action photographs, and/or video recordings or segments into the compilation video of the activity by combining them into the video of the activity with no further editing or input (e.g., sequentially, in the order they were recorded or captured). In other embodiments, however, the compilation video may be compiled (e.g., by video processing engine) using the one or more photographs, action photographs, and/or video recordings or segments into the compilation video of the activity by combining them with one or more graphical indications or representation of the one or more events that occurred during the recreational events and/or activities. These graphical representations may include graphics indicating the particular recreational events and/or activities recorded by the computing device displaying graphical user interface 500 and/or executing application 502.

In other embodiments, once the compilation video is complete, and the video is ready to be transferred, the compilation video may be displayed via graphical user interface 500 and/or application 502 on the executing computing device itself and/or sent to one or more destination devices (e.g., mobile devices, computing devices, kiosks, and/or other devices associated with the user, the participant, or another party), a media database (e.g., a cloud-based storage device), or both, among other possibilities. In any event, once the compilation video is complete and ready for transfer, one or more further actions may be undertaken before the compilation video (and/or parts of the compilation video) is actually transferred to another party (e.g., the participant or participants of the activity).

Figure 5E:
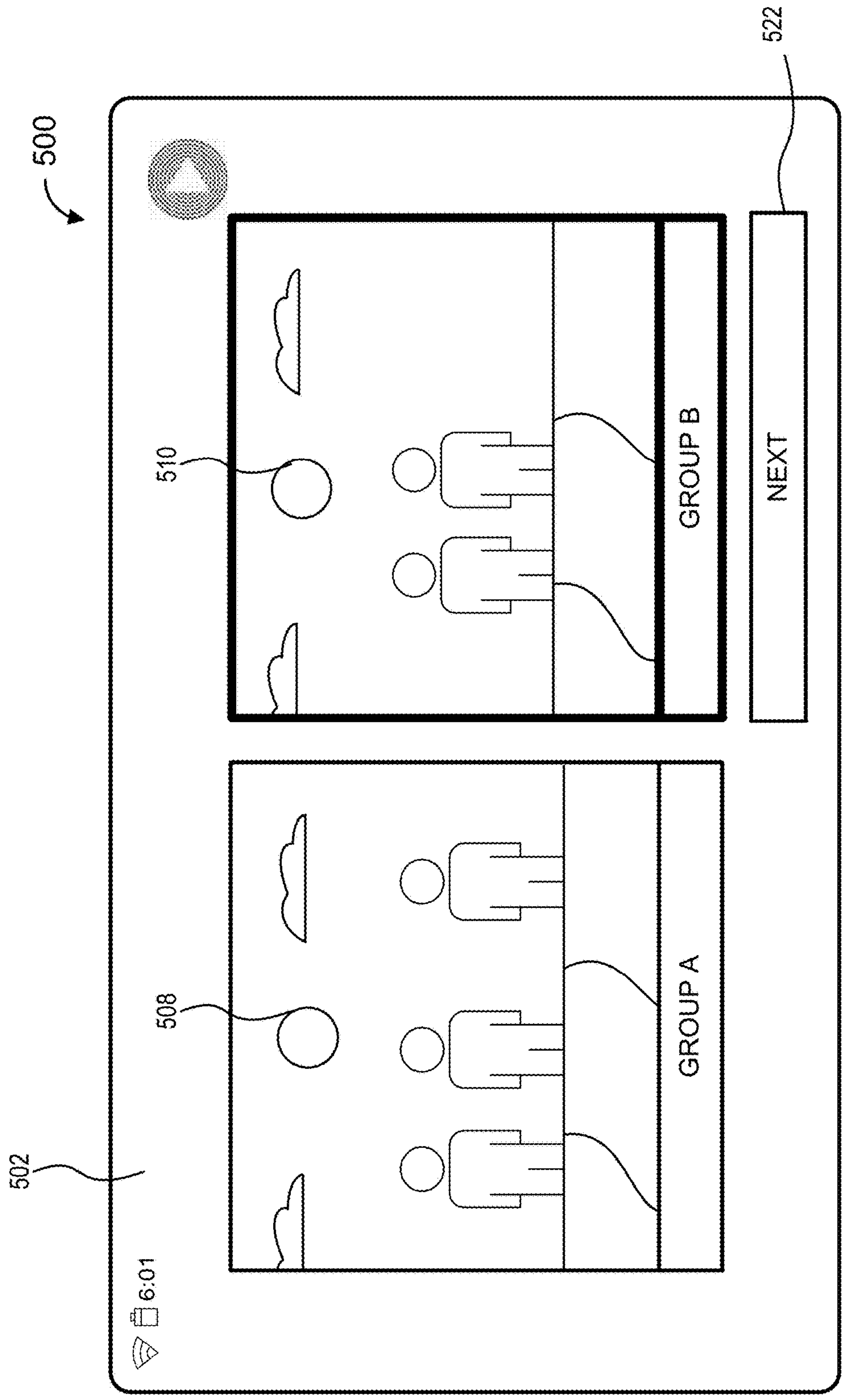
FIG. 5E depicts the example graphical user interface of FIGS. 5A, 5B, 5C, and 5D in a fifth state, in accordance with example embodiments.

For example, turning to FIG. 5E, interface 500 and/or application 502 has switched to a distribution mode, wherein both of the first user profile 508 and second user profile 510 have been represented and second user profile 510 has been selected (e.g., by the user of the application 502 and/or interface 500, and/or by a participant of the recorded activity, potentially via a second computing device (e.g., a kiosk, mobile computing device associated with the second user profile, etc.). As also shown in FIG. 5D, because the second user profile 510 has been selected, if the user selects the advancement icon 522 (shown here as "NEXT"), then additional content may be generated and displayed to the user, which may pertain specifically to second user profile 510.

Figure 5F:
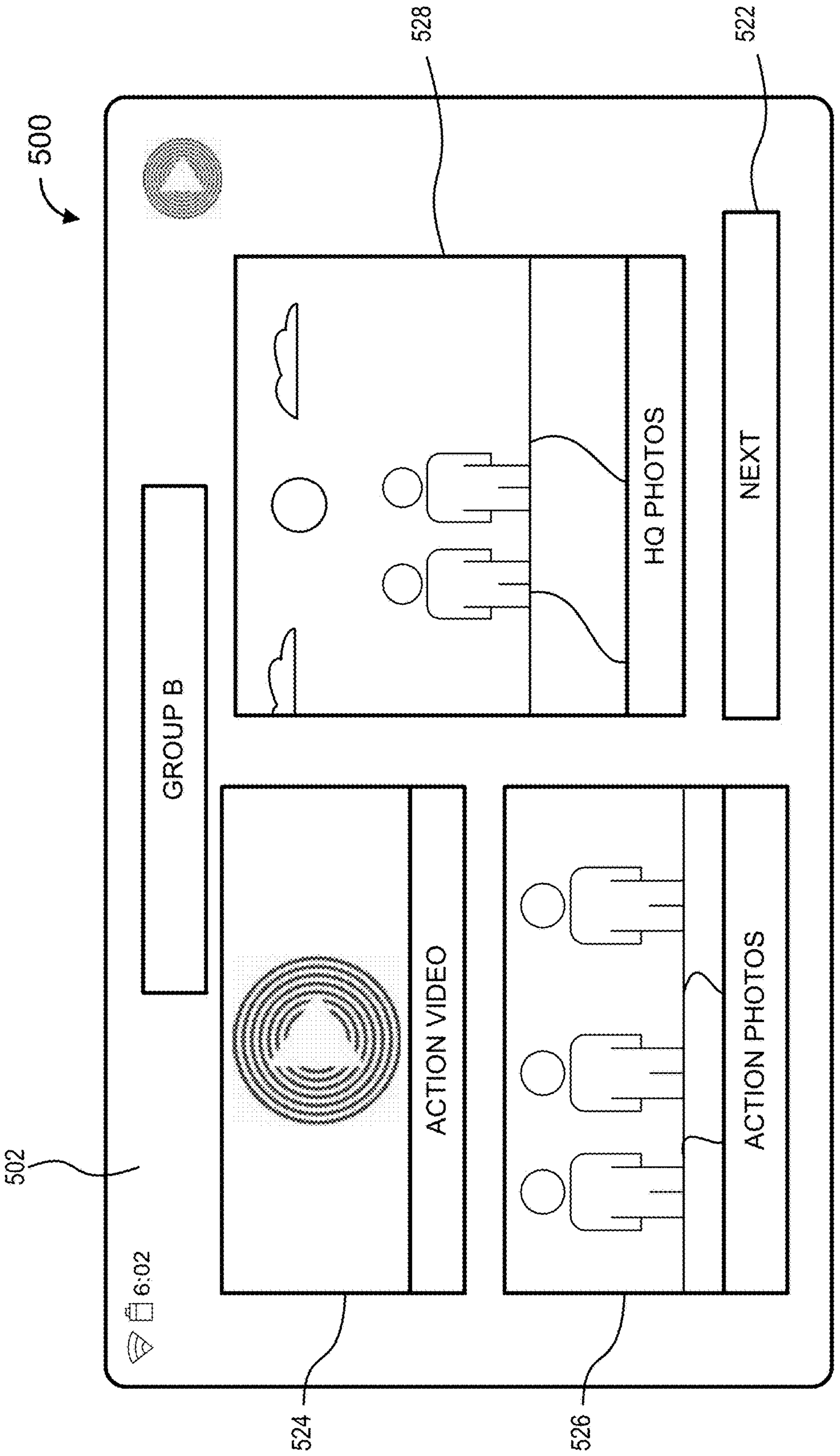
FIG. 5F depicts the example graphical user interface of FIGS. 5A, 5B, 5C, 5D, and 5E in a sixth state, in accordance with example embodiments.

For example, turning to FIG. 5F, because the second user profile 510 has been selected, interface 500 now displays a content preview mode associated with the one or more photographs, action photographs, and/or video recordings captured from the live video feed and/or the compilation video based on these recordings. For example, as illustrated in FIG. 5F, an action video preview 524 (shown here as "ACTION VIDEO"), action photograph preview 526 (shown here as "ACTION PHOTOS"), and photograph preview 528 (shown here as "HQ PHOTOS") are displayed. In a further aspect, for each of the action video preview 524, action photograph preview 526, and photograph preview 528, if a user selects one of the previews, interface 500 may displays a more detailed preview mode of the content therein. In some example, if the user selects action video preview 524, the interface 500 may play a portion (or the entirety) of the compilation video for the user, potentially as a preview for the user to purchase the compilation video. In other examples, interface 500 may automatically play a portion (or the entirety) of the compilation video for the user once the application 502 displays the graphical user interface in FIG. 5F (i.e., immediately after the second user profile 510 has been selected, as shown in FIG. 5D), so that the user is immediately shown the compilation video after completion of the activity and/or as a first content preview after the user has selected their user profile.

In other examples, if the user selects action photograph preview 526, the interface 500 may create and display a portion (or the entirety) of the action photographs selected from the live video recording and associated with the user (e.g., via a photograph gallery view for a user associated with a particular user profile), potentially as a preview for the user to purchase one or more of the action photographs. In other examples, if the user selects photograph preview 528, the interface 500 may create and display a portion (or the entirety) of the photographs captured from the live video feed and associated with the user (e.g., via a photograph gallery view for a user associated with a particular user profile), potentially as a preview for the user to purchase one or more of the photographs. Once the user has reviewed the content provided by the content preview mode, if the user selects the advancement icon 522 (shown here as "NEXT"), then additional content may be generated and displayed to the user, which may again pertain specifically to second user profile 510.

Figure 5G:
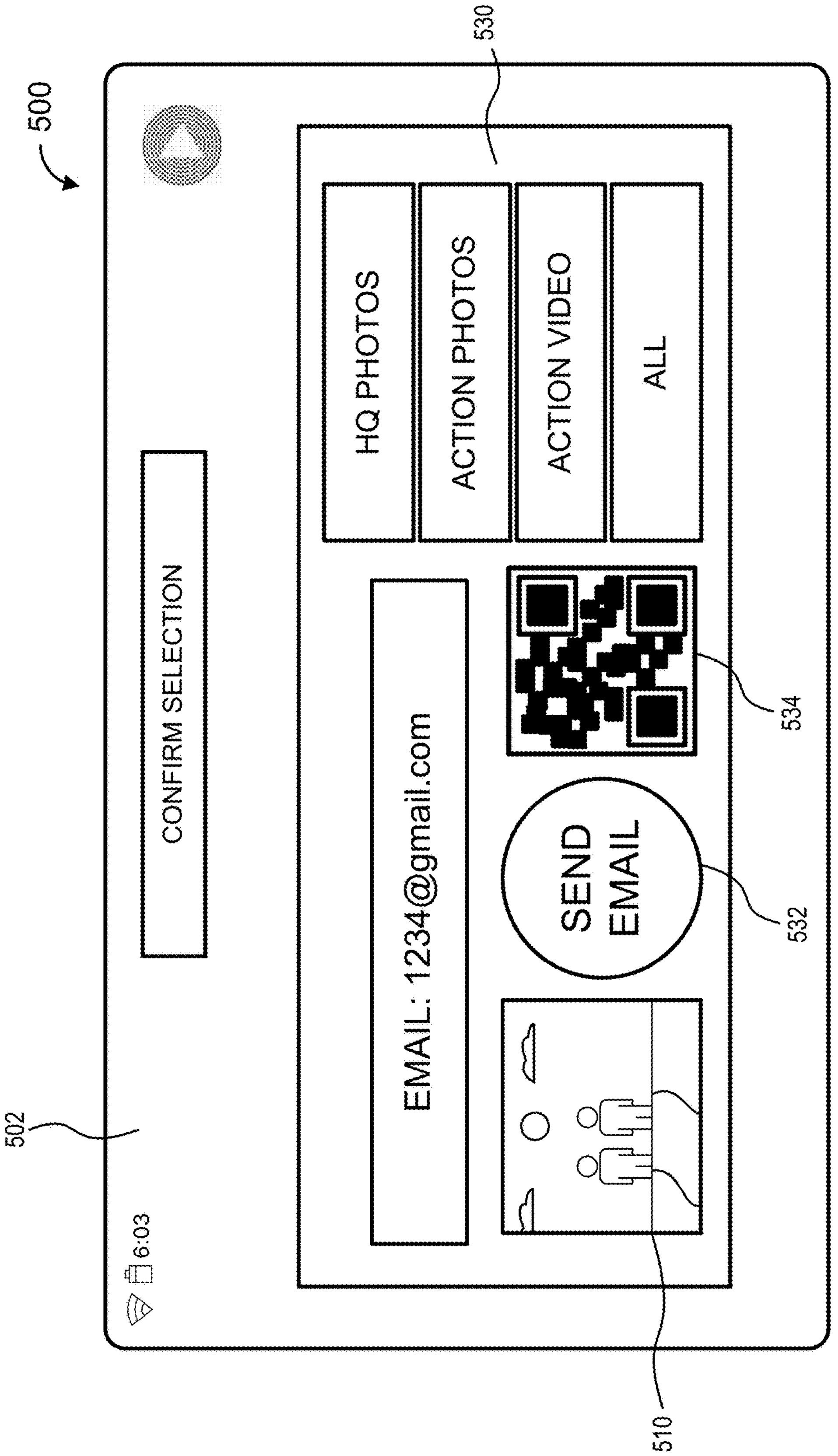
FIG. 5G depicts the example graphical user interface of FIGS. 5A, 5B, 5C, 5D, 5E, and 5F in a seventh state, in accordance with example embodiments.

For example, turning to FIG. 5G, because the second user profile 510 has been selected and previewed, interface 500 now displays a content procurement mode associated with the one or more photographs, action photographs, and/or video recordings captured from the live video feed and/or the compilation video based on these recordings. For example, as illustrated in FIG. 5G, procurement icons 530 (shown here as "HQ PHOTOS", "ACTION PHOTOS", "ACTION VIDEO", and "ALL"), email icon 532 (shown here as "SEND EMAIL"), and QR code icon 534 (shown here as a QR code) are displayed. In a further aspect, for each of the procurement icons 530, if a user selects one of the icons, interface 500 may displays content associated with each (e.g., the monetary cost associated with a user procuring each of the "HQ PHOTOS", "ACTION PHOTOS", "ACTION VIDEO", and/or "ALL" of them.

In other examples, if the user selects one or more of the procurement icons 530, the user may complete the procurement of this content by selecting email icon 532, which may cause the computing device to deliver the content a particular email address (which may be associated with the user's individual user profile or input by the respective user via user interface 500 and/or application 502). In other examples, if the user selects one or more of the procurement icons 530, the user may complete the procurement of this content by interacting with (e.g., scanning) QR code icon 534, which may cause the computing device to deliver the content a particular email address, website, social media channel, or other delivery mechanism (any or all of which may be associated with the user's individual user profile). In a further aspect, QR code icon 534, may be used for credentialing (e.g., to verify the user is the proper participant to pick up the purchased content), among other possibilities.

These example graphical user interfaces are merely for purposes of illustration. The features described herein may involve graphical user interfaces that are configured or formatted differently, include more or less information and/or additional or fewer instructions, include different types of information and/or instructions, and relate to one another in different ways.

V. Method Flowchart and Example Embodiments

Figure 6:
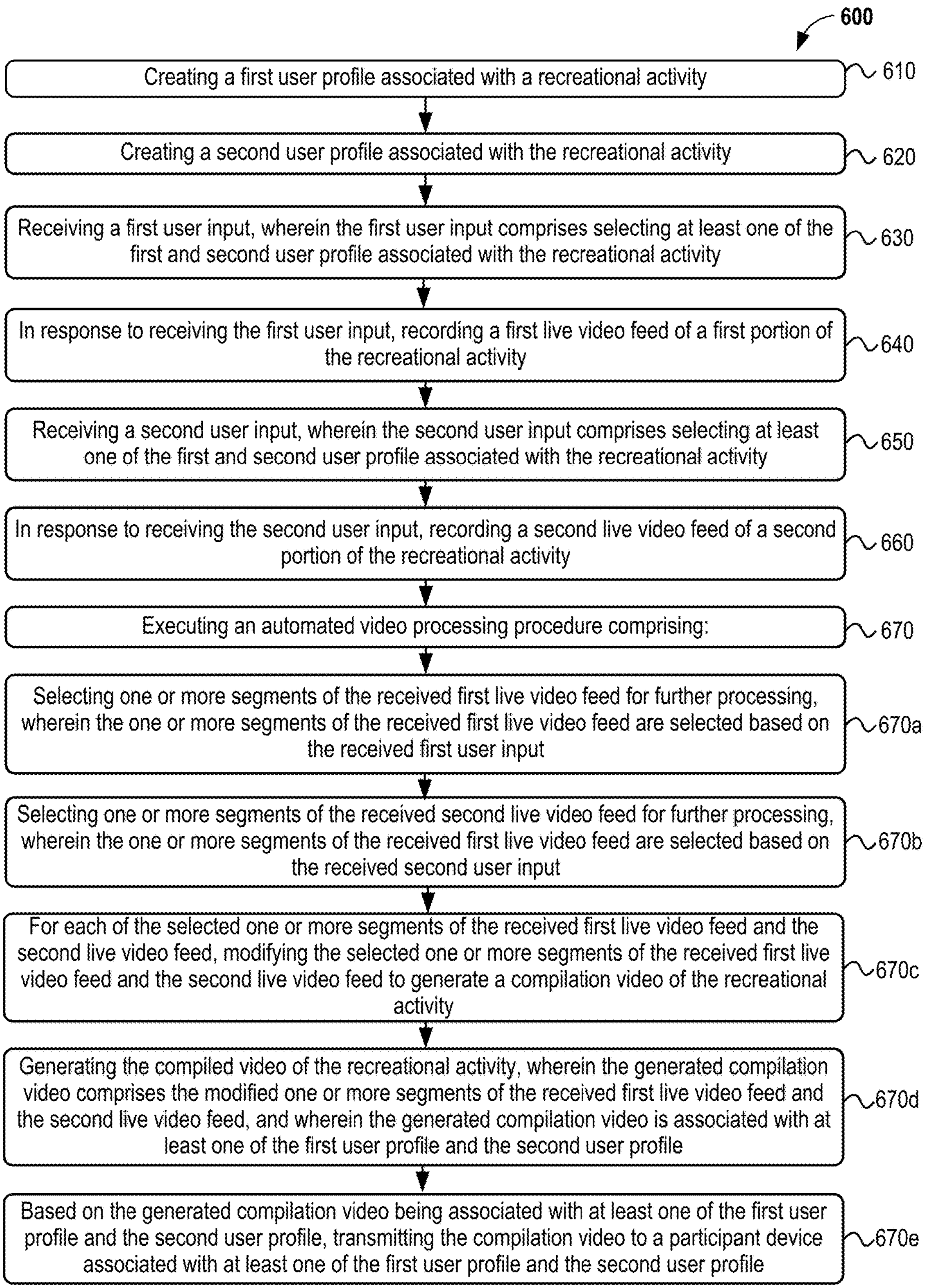
FIG. 6 is a flowchart of a method, in accordance with example embodiments.

FIG. 6 illustrates a flowchart showing an example method 600 executed by the computing device to capture, alter, and compile video segments into a compilation video of a recreational activity or event. Method 600 may be carried out by one or more computing devices, such as computing device 102, computing system 112, computing device 200, computing devices 300 and 400, and/or graphical user interface 500, as illustrated and described with respect to FIGS. 1, 2, 3, 4, and 5. In additional examples, method 600 may be carried out by computing device 102, computing system 112, computing device 200, computing devices 300 and 400, and/or graphical user interface 500, operating as part of a cloud-based computing system. Additionally, method 600 may be performed by one or more other types of computing systems and devices other than those illustrated in FIGS. 1, 2, 3, 4, and 5.

Further, the functionality described in connection with the flowcharts described herein can be implemented via one or more parts or components of the computing systems and computing devices illustrated in FIG. 1 (e.g., camera 104, controller 106, and/or video processing engine 108), FIG. 2 (e.g., processors 210 and/or data storage device 212 with computer-readable instructions 214), FIG. 3 (e.g., computing device 300), FIG. 4 (e.g., computing device 400), and/or FIG. 5 (e.g., graphical user interface 500).

Moreover, for each block of the flowchart illustrated in FIG. 6, the circuitry and/or components shown in and described with reference to FIGS. 1, 2, 3, 4, and 5 allows each block to be performed under the functionality of the specific component, as well as part of the functionality of the device on which the specific component is implemented. Further, the blocks of the flowchart illustrated in FIG. 6 may be executed in or out of the order shown, as long as the overall functionality of the described method is maintained.

At block 610, method 600 includes creating a first user profile associated with a recreational activity. In some embodiments, the computing system creates the first user profile as illustrated in, at least, FIG. 5.

At block 620, method 600 includes creating a second user profile associated with a recreational activity. In some embodiments, the computing system creates the second user profile as illustrated in, at least, FIG. 5.

At block 630, method 600 includes receiving a first user input, wherein the first user input comprises selecting at least one of the first and second user profile associated with the recreational activity. In some embodiments, the computing system performs this functionality as illustrated in, at least, FIG. 5.

At block 640, method 600 includes in response to receiving the first user input, recording a first live video feed of a first portion of the recreational activity. In some embodiments, the computing system performs this functionality as illustrated in, at least, FIG. 5.

At block 650, method 600 includes receiving a second user input, wherein the second user input comprises selecting at least one of the first and second user profile associated with the recreational activity. In some embodiments, the computing system performs this functionality as illustrated in, at least, FIG. 5.

At block 660, method 600 includes in response to receiving the second user input, recording a second live video feed of a second portion of the recreational activity. In some embodiments, the computing system performs this functionality as illustrated in, at least, FIG. 5.

In some examples, the computing device performs one or more aspects of an automated (or at least semi-automated) video processing procedure. In some embodiments, after the computing system receives the first and/or second user input, the computing system may not undertake more than one automated (or at least semi-automated) video processing procedure until the automated video processing procedure is completed. In other examples, however, after the computing system receives the first user input, the computing system may receive the second user input, some or all of which may require their own individual automated (or at least semi-automated) video processing procedure, in spite of the non-completion of the first automated video processing procedure already initiated by the computing device.

At block 670, method 600 further includes executing an automated video processing procedure. In operation, the video processing procedure engages the computing device and/or computing system to perform a variety tasks that cause the computing system to capture, alter, and compile video segments into a video of a recreational activity.

For example, at block 670*a*, method 600 includes selecting one or more segments of the received first live video feed for further processing, wherein the one or more segments of the received first live video feed are selected based on the received first user input. In particular, the computing device may select one or more segments received from the camera based on the received user input, by referencing a predetermined script, or a combination of the two.

At block 670*b*, method 600 includes selecting one or more segments of the received second live video feed for further processing, wherein the one or more segments of the received second live video feed are selected based on the received second user input. In particular, the computing device may select one or more segments received from the camera based on the received user input, by referencing a predetermined script, or a combination of the two.

At block 670*c*, method 600 further includes, for each of the selected one or more segments of the received first live video feed and the second live video feed, modifying the selected one or more segments of the received first live video feed and the second live video feed to generate a compilation video of the recreational activity. In particular, the computing device may modify the selected one or more segments in one or more ways that improve the quality and/or consistency of the selected segments and/or the computing device's ability to accurately and efficiently execute the automated video procedure.

At block 670*d*, method 600 further includes generating the compilation video of the recreational activity, wherein the generated compilation video comprises the modified one or more segments of the received first live video feed and the second live video feed, and wherein the generated compilation video is associated with at least one of the first user profile and the second user profile. In particular, the computing device may compile the one or segments into a compilation video of the recreational activity or event by combining the one or more segments directly (e.g., stitching the segments together in a particular order) and/or in combining them with other segments (e.g., previously recorded stock video segments).

At block 670*e*, method 600 further includes, based on the generated compilation video being associated with at least one of the first user profile and the second user profile, transmitting the compilation video to a participant device associated with at least one of the first user profile and the second user profile. In some examples, the methods described herein may further include the computing device storing a copy of the finalized compilation video in a tangible, non-transitory readable memory of the computing system. In a further aspect, the storage of this video may be duplicative (e.g., storing a first copy of the video in a first tangible, non-transitory computer-readable memory of the computing device and storing a second copy of the video in a second tangible, non-transitory computer-readable memory of a separate computing device).

In a further aspect, a copy of this video may be provided to a participant of the captured video in a variety of ways, including: directly transmitted to a computing device associated with the participant (e.g., via email, transmitted based on scanning a QR code, etc.), uploading the video to a website or physical kiosk for the participant's review and selection, uploading the video to a social media site/service associated with the user, the participant, or some other party, or transferred to a device associated with the user, the participant, or some other party (e.g., a camera, smart phone, tablet or other computing device) in other ways, among other scenarios.

Additionally, although such duplicative transfer and/or storage may improve convenience for the user, the participant, or some other party, these copies may also be used as backup redundant copies in the event of a failure or destruction of one of the aforementioned devices. Further, although these example embodiments generally relate to one activity participant, they apply to groups of activity participants as well (e.g., for a group of ten participants, there may be ten videos and/or related media created and transmitted via WIFI to a kiosk at visitation center, where all ten participants may review and/or purchase placed one or more of the aforementioned finalized product).

In other embodiments, method 600 may further comprise adjusting an operational parameter of the automated video processing procedure, potentially based on based on user input and/or other data. For example, these adjustments may include at least one of the following operational parameters of the automated video processing procedure: (i) a duration of the selected one or more segments of the first live video feed; (ii) a duration of the selected one or more segments of the second live video feed; (iii) a modification of the selected one or more segments of the first live video feed; (iv) a modification of the selected one or more segments of the second live video feed; and (v) an order of compilation for the modified the selected one or more segments of the received first live video feed and the second live video feed to generate a compilation video of the recreational activity.

Finally, while it is true that a number of the aspects, examples, and embodiments of the claimed invention have been disclosed herein, it is also true that other aspects, examples, and embodiments of the claimed invention will be readily apparent to those skilled in the art. Accordingly, the aspects, examples, and embodiments of the claimed invention disclosed herein are provided for the purpose of explanation only, and should not be interpreted to be limiting. Instead, the most accurate and true scope of the claimed invention are captured in the following claims.

The invention claimed is:

1. A computing device for generating a video compilation of a recreational activity, wherein the computing device comprises:

a camera;

a network interface;

a graphical user interface;

one or more processors; and a non-transitory, computer-readable medium storing instructions that, when executed by the one or more processors, cause the computing device to perform a set of operations comprising:

creating a user profile associated with a recreational activity;

receiving a first user input, wherein the first user input comprises selecting the user profile;

in response to receiving the first user input, recording a first live video feed of a first portion of the recreational activity;

receiving a second user input;

in response to receiving the second user input, recording a second live video feed of a second portion of the recreational activity; and executing an automated video processing procedure comprising:

(i) selecting one or more segments of the recorded first live video feed and the second live video feed for further processing, wherein the one or more segments are selected based on at least one of the received first user input and the received second user input;

(ii) for each of the selected one or more segments, modifying the selected one or more segments to generate a compilation video of the recreational activity;

(iii) generating the compilation video of the recreational activity, wherein the generated compilation video comprises the modified one or more segments, and wherein the generated compilation video is associated with the user profile; and (iv) based on the generated compilation video being associated with the user profile, transmitting the compilation video to a participant device associated with the user profile.

2. The computing device of claim 1, wherein the set of operations further comprise adjusting at least one operational parameter of the automated video processing procedure based the generated compilation video being associated with the user profile.

3. The computing device of claim 2, wherein the at least one operational parameter of the automated video processing procedure comprises one or more of the following: (i) a duration of the selected one or more segments of the first live video feed; (ii) a duration of the selected one or more segments of the second live video feed; (iii) a modification of the selected one or more segments of the first live video feed; (iv) a modification of the selected one or more segments of the second live video feed; and (v) an order of compilation for the modified the selected one or more segments of the recorded first live video feed and the second live video feed to generate a compilation video of the recreational activity.

4. The computing device of claim 1, wherein generating the compilation video of the recreational activity further comprises:

selecting one or more stock video segments from a library of previously recorded stock video segments; and interleaving a least a portion of the selected one or more segments of the recorded first live video feed and the second live video feed with at least a portion of one or more stock video segments, thereby causing the compilation video to depict an ordered sequence of events representative of the recreational activity.

5. The computing device of claim 4, wherein the set of operations further comprise altering the one or more stock video segments so that the modified one or more segments and the one or more stock video segments all appear to be footage associated with the recreational activity.

6. The computing device of claim 5, wherein altering the one or more stock video segments so that the one or more modified video segments and the one or more stock video segments all appear to be footage from the recreational activity comprises:

adjusting playback speed and/or one or more brightness, contrast, grading, saturation, color balance, or image filter parameters to achieve a consistent look across the one or more modified video segments and the one or more stock video segments.

7. The computing device of claim 1, wherein the set of operations further comprise displaying the one or more recorded live video feeds of the recreational activity, wherein each live video feed is obtained from the camera to a user for review.

8. The computing device of claim 7, wherein the set of operations further comprise:

receiving, via the graphical user interface, a selection of an image in one or more of the displayed live video feeds;

interleaving the selected image with the one or more segments of the recorded first live video feed and the second live video feed with at least a portion of one or more stock video segments, thereby causing the compilation video to depict an ordered sequence of events representative of the recreational activity; and based on the generated compilation video being associated with the user profile, transmitting, via the network interface, the selected image to the participant device associated with the user profile.

9. A non-transitory computer-readable medium, having stored thereon program instructions that, upon execution by a computing device, cause the computing device to perform a set of operations comprising:

creating a user profile associated with a recreational activity;

receiving a first user input, wherein the first user input comprises selecting the user profile;

in response to receiving the first user input, recording a first live video feed of a first portion of the recreational activity;

receiving a second user input;

in response to receiving the second user input, recording a second live video feed of a second portion of the recreational activity; and executing an automated video processing procedure comprising:

(i) selecting one or more segments of the recorded first live video feed and the second live video feed for further processing, wherein the one or more segments are selected based on at least one of the received first user input and the received second user input;

(ii) for each of the selected one or more segments, modifying the selected one or more segments to generate a compilation video of the recreational activity;

(iii) generating the compilation video of the recreational activity, wherein the generated compilation video comprises the modified one or more segments, and wherein the generated compilation video is associated with the user profile; and (iv) based on the generated compilation video being associated with the user profile, transmitting the compilation video to a participant device associated with the user profile.

10. The non-transitory computer-readable medium of claim 9, wherein the set of operations further comprise adjusting at least one operational parameter of the automated video processing procedure based the generated compilation video being associated with the user profile.

11. The non-transitory computer-readable medium of claim 10, wherein the at least one operational parameter of the automated video processing procedure comprises one or more of the following: (i) a duration of the selected one or more segments of the first live video feed; (ii) a duration of the selected one or more segments of the second live video feed; (iii) a modification of the selected one or more segments of the first live video feed; (iv) a modification of the selected one or more segments of the second live video feed; and (v) an order of compilation for the modified the selected one or more segments of the recorded first live video feed and the second live video feed to generate a compilation video of the recreational activity.

12. The non-transitory computer-readable medium of claim 9, wherein generating the compilation video of the recreational activity further comprises:

selecting one or more stock video segments from a library of previously recorded stock video segments; and interleaving a least a portion of the selected one or more segments of the recorded first live video feed and the second live video feed with at least a portion of one or more stock video segments, thereby causing the compilation video to depict an ordered sequence of events representative of the recreational activity.

13. The non-transitory computer-readable medium of claim 12, wherein the set of operations further comprise altering the one or more stock video segments so that the modified one or more segments and the one or more stock video segments all appear to be footage associated with the recreational activity.

14. The non-transitory computer-readable medium of claim 13, wherein altering the one or more stock video segments so that the one or more modified video segments and the one or more stock video segments all appear to be footage from the recreational activity comprises:

adjusting playback speed and/or one or more brightness, contrast, grading, saturation, color balance, or image filter parameters to achieve a consistent look across the one or more modified video segments and the one or more stock video segments.

15. The non-transitory computer-readable medium of claim 9, wherein the set of operations further comprise displaying the one or more recorded live video feeds of the recreational activity, wherein each live video feed is obtained from a user for review.

16. The non-transitory computer-readable medium of claim 15, wherein the set of operations further comprise:

receiving a selection of an image in one or more of the displayed live video feeds;

interleaving the selected image with the one or more segments of the recorded first live video feed and the second live video feed with at least a portion of one or more stock video segments, thereby causing the compilation video to depict an ordered sequence of events representative of the recreational activity; and based on the generated compilation video being associated with the user profile, transmitting the selected image to the participant device associated with the user profile.

17. A computer-implemented method comprising:

creating a user profile associated with a recreational activity;

receiving a first user input, wherein the first user input comprises selecting the user profile;

in response to receiving the first user input, recording a first live video feed of a first portion of the recreational activity;

receiving a second user input;

in response to receiving the second user input, recording a second live video feed of a second portion of the recreational activity; and executing an automated video processing procedure comprising:

(i) selecting one or more segments of the recorded first live video feed and the second live video feed for further processing, wherein the one or more segments are selected based on at least one of the received first user input and the received second user input;

(ii) for each of the selected one or more segments, modifying the selected one or more segments to generate a compilation video of the recreational activity;

(iii) generating the compilation video of the recreational activity, wherein the generated compilation video comprises the modified one or more segments, and wherein the generated compilation video is associated with the user profile; and (iv) based on the generated compilation video being associated with the user profile, transmitting the compilation video to a participant device associated with the user profile.

18. The computer-implemented method of claim 17, further comprising adjusting at least one operational parameter of the automated video processing procedure based the generated compilation video being associated with the user profile.

19. The computer-implemented method of claim 18, wherein the at least one operational parameter of the automated video processing procedure comprises one or more of the following: (i) a duration of the selected one or more segments of the first live video feed; (ii) a duration of the selected one or more segments of the second live video feed; (iii) a modification of the selected one or more segments of the first live video feed; (iv) a modification of the selected one or more segments of the second live video feed; and (v) an order of compilation for the modified the selected one or more segments of the recorded first live video feed and the second live video feed to generate a compilation video of the recreational activity.

20. The computer-implemented method of claim 17, wherein generating the compilation video of the recreational activity further comprises:

selecting one or more stock video segments from a library of previously recorded stock video segments; and interleaving a least a portion of the selected one or more segments of the recorded first live video feed and the second live video feed with at least a portion of one or more stock video segments, thereby causing the compilation video to depict an ordered sequence of events representative of the recreational activity.

* * * * *